United States Patent
Maheve et al.

(10) Patent No.: US 12,474,945 B2
(45) Date of Patent: Nov. 18, 2025

(54) NETWORK CONFIGURATION UPDATE

(71) Applicant: Sophos Limited, Abingdon (GB)

(72) Inventors: Sanjeev Kumar Maheve, Bangalore (IN); Thiyagu Rajendran, Bangalore (IN)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 17/690,766

(22) Filed: Mar. 9, 2022

(65) Prior Publication Data

US 2023/0119503 A1    Apr. 20, 2023

Related U.S. Application Data

(63) Continuation of application No. PCT/US2022/018635, filed on Mar. 3, 2022.
(Continued)

(30) Foreign Application Priority Data

Oct. 18, 2021    (IN) .............................. 202111047216

(51) Int. Cl.
G06F 9/455    (2018.01)
G06F 3/0482    (2013.01)
(Continued)

(52) U.S. Cl.
CPC ........ G06F 9/45558 (2013.01); G06F 3/0482 (2013.01); G06F 8/65 (2013.01);
(Continued)

(58) Field of Classification Search
CPC . H04L 67/104; H04L 41/024; H04L 12/2803; H04L 12/2809; H04L 51/046; H04L 61/256; H04L 67/141; H04L 67/55; H04L 63/20; H04L 41/18; H04L 41/28; H04L 63/02; H04L 63/0478; H04L 63/0876; H04L 41/0213; H04L 41/0233; H04L 41/08; H04L 41/0803;
(Continued)

(56) References Cited

U.S. PATENT DOCUMENTS 5,784,237 A * 7/1998 Velez ..................... H02H 7/262
                                                    361/64
6,484,261 B1    11/2002 Wiegel
(Continued)

FOREIGN PATENT DOCUMENTS

CN    112788019    5/2021
WO    WO-2023069129    4/2023

OTHER PUBLICATIONS

USPTO, "U.S. Appl. No. 17/690,607 Notice of Allowance mailed Jan. 12, 2023", 11 pages.
(Continued)

*Primary Examiner* — Ninos Donabed
(74) *Attorney, Agent, or Firm* — Strategic Patents, P.C.

(57) ABSTRACT

A cluster of nodes are sequentially updated with new network configuration settings in order to maintain availability of the cluster during the update. In the sequential update, each node conditionally updates network configuration settings, tests connectivity, and retains an update to the configuration only if the node is able to restore connectivity suitable for operation in the cluster.

20 Claims, 22 Drawing Sheets

Related U.S. Application Data

(60) Provisional application No. 63/271,652, filed on Oct. 25, 2021.

(51) Int. Cl.

| | | |
|---|---|---|
| *G06F 8/65* | (2018.01) | |
| *G06F 8/71* | (2018.01) | |
| *G06F 9/4401* | (2018.01) | |
| *G06F 9/50* | (2006.01) | |
| *G06F 11/14* | (2006.01) | |
| *G06F 21/62* | (2013.01) | |
| *H04L 9/32* | (2006.01) | |
| *H04L 9/40* | (2022.01) | |
| *H04L 12/66* | (2006.01) | |
| *H04L 41/082* | (2022.01) | |
| *H04L 43/0811* | (2022.01) | |
| *H04L 67/141* | (2022.01) | |
| *H04L 67/146* | (2022.01) | |

(52) U.S. Cl.
CPC .............. *G06F 8/71* (2013.01); *G06F 9/4401* (2013.01); *G06F 9/5077* (2013.01); *G06F 11/1438* (2013.01); *G06F 11/1451* (2013.01); *G06F 21/6209* (2013.01); *H04L 9/3213* (2013.01); *H04L 9/3228* (2013.01); *H04L 9/3247* (2013.01); *H04L 12/66* (2013.01); *H04L 41/082* (2013.01); *H04L 43/0811* (2013.01); *H04L 63/02* (2013.01); *H04L 63/029* (2013.01); *H04L 63/0869* (2013.01); *H04L 63/0876* (2013.01); *H04L 63/20* (2013.01); *H04L 67/141* (2013.01); *H04L 67/146* (2013.01); *G06F 2009/4557* (2013.01); *G06F 2009/45595* (2013.01); *G06F 2209/505* (2013.01)

(58) Field of Classification Search
CPC . H04L 63/0815; H04L 65/1101; H04L 41/04; H04L 41/0813; H04L 41/0816; H04L 41/082; H04L 41/0866; H04L 41/0869; H04L 41/0873; H04L 41/0894; H04L 41/0893; H04L 41/0895; H04L 41/122; H04L 41/40; H04L 63/0218; H04L 63/0281; H04L 41/5096; H04L 41/0879; H04L 67/125; H04L 67/10; H04L 43/10; H04L 63/166; H04L 63/164; H04L 45/38; H04L 45/44; H04L 45/46; H04L 45/563; H04L 45/566; H04L 45/56; H04L 45/76; H04L 63/0263; H04L 9/3213; H04L 9/3228; H04L 9/3247; H04L 12/66; H04L 43/0811; H04L 63/029; H04L 63/0869; H04L 67/146; G06F 9/45558; G06F 3/0482; G06F 8/65; G06F 8/71; G06F 9/4401; G06F 9/5077; G06F 11/1438; G06F 11/1451; G06F 21/6209; G06F 2009/4557; G06F 2009/45595; G06F 2209/505

See application file for complete search history.

(56) References Cited

U.S. PATENT DOCUMENTS

| | | | |
|---|---|---|---|
| 6,769,008 B1 | 7/2004 | Kumar et al. | |
| 6,801,949 B1* | 10/2004 | Bruck | H04L 61/25 709/234 |
| 7,676,829 B1 | 3/2010 | Gui et al. | |
| 8,181,244 B2 | 5/2012 | Boney | |
| 8,201,243 B2 | 6/2012 | Boney | |
| 8,418,250 B2 | 4/2013 | Morris et al. | |
| 8,719,932 B2 | 5/2014 | Boney | |
| 8,726,389 B2 | 5/2014 | Morris et al. | |
| 8,763,123 B2 | 6/2014 | Morris et al. | |
| 8,856,505 B2 | 10/2014 | Schneider | |
| 9,007,953 B1* | 4/2015 | Broyles | H04L 41/0883 370/253 |
| 9,306,864 B2* | 4/2016 | Thakkar | G06F 15/177 |
| 9,378,359 B2 | 6/2016 | Qureshi et al. | |
| 9,386,605 B2* | 7/2016 | Reitsma | H04W 76/50 |
| 9,413,721 B2 | 8/2016 | Morris et al. | |
| 9,578,045 B2 | 2/2017 | Jaroch et al. | |
| 10,257,224 B2 | 4/2019 | Jaroch et al. | |
| 10,348,767 B1* | 7/2019 | Lee | H04L 63/0236 |
| 10,411,894 B1 | 9/2019 | Yavnilovich et al. | |
| 10,958,662 B1* | 3/2021 | Sole | H04L 63/0853 |
| 11,005,853 B1 | 5/2021 | Agarwal et al. | |
| 11,019,166 B2* | 5/2021 | Brasetvik | H04L 41/0813 |
| 11,050,716 B1 | 6/2021 | De Hoz Diego | |
| 11,134,058 B1* | 9/2021 | Sole | H04W 12/12 |
| 11,159,546 B1 | 10/2021 | Moore et al. | |
| 11,200,123 B2 | 12/2021 | Ding et al. | |
| 11,218,446 B2 | 1/2022 | Leon | |
| 11,316,842 B2 | 4/2022 | Bendersky et al. | |
| 11,356,508 B1 | 6/2022 | Vergara et al. | |
| 11,363,496 B2 | 6/2022 | Raleigh et al. | |
| 11,409,622 B1 | 8/2022 | Kaushik et al. | |
| 11,457,040 B1* | 9/2022 | Sole | H04L 63/101 |
| 11,522,904 B2 | 12/2022 | Mcardle et al. | |
| 11,573,786 B1 | 2/2023 | Kiselev et al. | |
| 11,588,794 B2 | 2/2023 | Keith, Jr. et al. | |
| 11,652,815 B2 | 5/2023 | Keith, Jr. et al. | |
| 11,663,030 B2 | 5/2023 | Kaimal et al. | |
| 11,695,733 B2 | 7/2023 | Hastings | |
| 11,729,144 B2 | 8/2023 | Ahn et al. | |
| 11,799,831 B2 | 10/2023 | Vemulpali | |
| 11,841,781 B2 | 12/2023 | Kaushik et al. | |
| 11,861,221 B1 | 1/2024 | Richardson et al. | |
| 11,886,932 B1 | 1/2024 | Dasgupta et al. | |
| 2002/0161869 A1 | 10/2002 | Griffin et al. | |
| 2003/0105761 A1* | 6/2003 | Lagerman | H04L 41/0859 |
| 2005/0204041 A1 | 9/2005 | Blinn et al. | |
| 2005/0232163 A1* | 10/2005 | Zabihi | H04L 41/0869 370/254 |
| 2006/0271931 A1 | 11/2006 | Harris et al. | |
| 2007/0156889 A1* | 7/2007 | Bhrara | G06F 11/0709 709/224 |
| 2008/0034401 A1 | 2/2008 | Wang | |
| 2008/0109871 A1 | 5/2008 | Jacobs | |
| 2008/0177994 A1 | 7/2008 | Mayer | |
| 2010/0094981 A1* | 4/2010 | Cordray | H04L 63/0227 709/224 |
| 2010/0325588 A1 | 12/2010 | Reddy et al. | |
| 2011/0107331 A1* | 5/2011 | Evans | H04W 4/60 718/1 |
| 2011/0231361 A1 | 9/2011 | Patchava et al. | |
| 2013/0117817 A1 | 5/2013 | Gantman et al. | |
| 2013/0201821 A1* | 8/2013 | Yamato | H04L 45/42 370/225 |
| 2014/0003307 A1* | 1/2014 | Williams | H04W 72/20 370/294 |
| 2014/0007222 A1 | 1/2014 | Qureshi et al. | |
| 2014/0047227 A1 | 2/2014 | Breternitz et al. | |
| 2014/0047342 A1 | 2/2014 | Breternitz et al. | |
| 2014/0172783 A1* | 6/2014 | Suzuki | G06F 8/63 707/754 |
| 2015/0264310 A1* | 9/2015 | Krishnaswamy | H04L 12/1827 348/14.12 |
| 2015/0295751 A1* | 10/2015 | Caison | H04L 63/0227 709/218 |
| 2016/0092203 A1 | 3/2016 | Filali-adib et al. | |
| 2016/0173535 A1 | 6/2016 | Barabash et al. | |
| 2016/0212167 A1 | 7/2016 | Dotan et al. | |
| 2016/0266892 A1* | 9/2016 | Sn | G06F 12/16 |
| 2016/0291957 A1* | 10/2016 | Sharma | G06F 9/45558 |
| 2016/0306862 A1 | 10/2016 | Sitsky et al. | |
| 2016/0337206 A1* | 11/2016 | Bugenhagen | H04L 41/0816 |
| 2017/0090903 A1 | 3/2017 | Bainville et al. | |

(56) References Cited

U.S. PATENT DOCUMENTS

| | | |
|---|---|---|
| 2017/0099280 A1 | 4/2017 | Goel et al. |
| 2017/0187750 A1 | 6/2017 | Zhang et al. |
| 2017/0250867 A1* | 8/2017 | Kohli .................. H04L 41/0893 |
| 2017/0316400 A1 | 11/2017 | Venkatakrishnan et al. |
| 2017/0318092 A1* | 11/2017 | Maredia ................ G06F 9/5061 |
| 2018/0136960 A1* | 5/2018 | Zhang .................. G06F 9/4856 |
| 2018/0293152 A1* | 10/2018 | Sherafat Kazemzadeh ................ G06F 11/3688 |
| 2019/0007392 A1 | 1/2019 | Rubiyath et al. |
| 2019/0050296 A1 | 2/2019 | Luo et al. |
| 2019/0149418 A1* | 5/2019 | Bertsche ............. G06F 16/1734 707/625 |
| 2019/0229987 A1* | 7/2019 | Shelke ................ H04L 41/0813 |
| 2019/0361915 A1 | 11/2019 | Weaver et al. |
| 2019/0372938 A1* | 12/2019 | Pasdar .................... H04L 63/20 |
| 2019/0379696 A1* | 12/2019 | Ludwig ............... H04L 63/1433 |
| 2020/0067938 A1* | 2/2020 | Smith .................. G06F 9/5072 |
| 2020/0092254 A1* | 3/2020 | Goeringer ............... H04L 45/46 |
| 2020/0137125 A1 | 4/2020 | Patnala et al. |
| 2020/0153898 A1* | 5/2020 | Sabath .................. G06F 9/4856 |
| 2020/0162922 A1 | 5/2020 | Kang et al. |
| 2020/0236112 A1 | 7/2020 | Pularikkal et al. |
| 2020/0249928 A1 | 8/2020 | Zeng et al. |
| 2020/0296119 A1 | 9/2020 | Lim et al. |
| 2020/0326930 A1 | 10/2020 | Suryanarayana et al. |
| 2020/0344115 A1* | 10/2020 | Power ..................... H04L 67/34 |
| 2020/0351157 A1* | 11/2020 | Patterson ............ H04L 41/0672 |
| 2021/0029119 A1* | 1/2021 | Raman ................ H04L 67/1001 |
| 2021/0224093 A1* | 7/2021 | Fu ......................... G06F 9/5072 |
| 2021/0266346 A1* | 8/2021 | Gordon ............... H04L 63/0245 |
| 2021/0314301 A1* | 10/2021 | Chanak ............... H04L 63/0823 |
| 2021/0334004 A1 | 10/2021 | Krivenok |
| 2021/0334222 A1 | 10/2021 | Wood |
| 2021/0336959 A1* | 10/2021 | Shah ..................... H04L 67/563 |
| 2021/0385129 A1* | 12/2021 | Shadbolt ............... H04L 63/126 |
| 2021/0389968 A1* | 12/2021 | Majewski ........... H04L 41/0803 |
| 2022/0012042 A1* | 1/2022 | Doshi ................... H04L 41/082 |
| 2022/0021665 A1 | 1/2022 | Barton et al. |
| 2022/0027138 A1* | 1/2022 | Stevens ................. G06F 21/572 |
| 2022/0078267 A1 | 3/2022 | Nixon et al. |
| 2022/0114157 A1* | 4/2022 | Rangasamy ............ G06F 8/65 |
| 2022/0191099 A1* | 6/2022 | Pieczul ............... H04L 41/0893 |
| 2022/0191248 A1* | 6/2022 | Pieczul ............... H04L 63/0227 |
| 2022/0210128 A1 | 6/2022 | Allam et al. |
| 2022/0210173 A1* | 6/2022 | Katmor ............... H04L 63/1416 |
| 2022/0224621 A1* | 7/2022 | Devarajan ............ H04L 43/103 |
| 2022/0239491 A1 | 7/2022 | Sugarev |
| 2022/0247785 A1 | 8/2022 | Ly et al. |
| 2022/0255822 A1* | 8/2022 | Yousouf ................ H04L 41/046 |
| 2022/0272082 A1 | 8/2022 | Gupta et al. |
| 2022/0272111 A1 | 8/2022 | Rao et al. |
| 2022/0278900 A1* | 9/2022 | Pieczul .................. H04L 41/22 |
| 2022/0337576 A1 | 10/2022 | Rao Krishnagi et al. |
| 2022/0342775 A1* | 10/2022 | Takubo .................. G06F 11/07 |
| 2022/0350628 A1* | 11/2022 | Parry-Barwick ... G06F 9/44505 |
| 2022/0350629 A1* | 11/2022 | Parry-Barwick ......... G06F 8/65 |
| 2022/0350630 A1* | 11/2022 | Parry-Barwick ......... G06F 8/65 |
| 2022/0350631 A1* | 11/2022 | Parry-Barwick ... G06F 9/45558 |
| 2022/0350675 A1* | 11/2022 | Navali .................. H04L 47/781 |
| 2022/0368691 A1 | 11/2022 | Desarda et al. |
| 2022/0377093 A1* | 11/2022 | Crabtree ............... H04L 43/045 |
| 2022/0385563 A1* | 12/2022 | Lalani ................. H04L 41/0816 |
| 2022/0400114 A1 | 12/2022 | Sreedhar et al. |
| 2022/0400116 A1 | 12/2022 | Sreedhar et al. |
| 2023/0025529 A1* | 1/2023 | Fu ......................... G06F 9/4406 |
| 2023/0035486 A1 | 2/2023 | Vergara et al. |
| 2023/0038058 A1 | 2/2023 | May |
| 2023/0060895 A1 | 3/2023 | Wu et al. |
| 2023/0069738 A1* | 3/2023 | Sreedhar ............... H04L 63/101 |
| 2023/0080458 A1* | 3/2023 | Lok ..................... H04L 12/4679 709/223 |
| 2023/0097099 A1* | 3/2023 | Kothiyal ............. H04L 63/0876 726/4 |
| 2023/0109926 A1 | 4/2023 | Nair et al. |
| 2023/0111304 A1 | 4/2023 | Thomas et al. |
| 2023/0111864 A1 | 4/2023 | Thomas et al. |
| 2023/0113375 A1 | 4/2023 | Thomas et al. |
| 2023/0113621 A1 | 4/2023 | Griffin et al. |
| 2023/0114719 A1 | 4/2023 | Thomas et al. |
| 2023/0114821 A1* | 4/2023 | Thomas .............. H04L 63/1441 726/23 |
| 2023/0117962 A1 | 4/2023 | Kaimal et al. |
| 2023/0119767 A1 | 4/2023 | Pabón |
| 2023/0120522 A1 | 4/2023 | Bhandari et al. |
| 2023/0120785 A1 | 4/2023 | Kaimal et al. |
| 2023/0121834 A1 | 4/2023 | Kaimal et al. |
| 2023/0123781 A1 | 4/2023 | Kaimal et al. |
| 2023/0216685 A1 | 7/2023 | Kaimal et al. |
| 2023/0254318 A1 | 8/2023 | Hu et al. |
| 2023/0362202 A1 | 11/2023 | Li et al. |

OTHER PUBLICATIONS

ISA/EP, "PCT Application No. PCT/US22/18635 International Search Report and Written Opinion mailed Aug. 16, 2022", 19 pages.

ISA/EP, , "PCT Application No. PCT/US22/18635 Invitation to Pay Additional Fees mailed Jun. 24, 2022", , 15 pages.

USPTO, , "U.S. Appl. No. 17/690,654 Notice of Allowance mailed Sep. 5, 2024", , 14 pages.

USPTO, , "U.S. Appl. No. 17/690,704 Non-Final Office Action mailed Sep. 16, 2024", , 8 pages.

WIPO, , "PCT Application No. PCT/US22/18635 International Preliminary Report on Patentability mailed May 2, 2024", , 13 pages.

USPTO, "U.S. Appl. No. 17/690,632 Non-Final Office Action mailed Apr. 24, 2024", 15 pages.

USPTO, "U.S. Appl. No. 17/690,654 Non-Final Office Action mailed Mar. 27, 2024", 24 pages.

USPTO, "U.S. Appl. No. 17/690,681 Notice of Allowance mailed Feb. 8, 2024", 6 pages.

USPTO, , "U.S. Appl. No. 17/690,704 Notice of Allowance mailed Feb. 4, 2025", NPL-1178 , 8 pages.

* cited by examiner

Agentless Policy Files

```
Static Policy File:

Package envoy.authz import data.envoy.authz.common
import input.attributes.request.http as http_request default allow = false allow {
    fqdn := http_request.headers[":authority"]
    common(fqdn).groups[_] == get_groups[_]
} allow {
    fqdn := http_request.headers[":authority"]
    common(fqdn).groups == ["*"]
} get_groups = groups {
    response := http.send({
        "method": "GET",
        "url": "http://oauth2-proxy:4180/oauth2/userinfo",
        "headers": {"Cookie": http_request.headers["cookie"]}
    })
    groups := response.body.groups
}

Application Policy File:

package envoy.authz.common ["splunk.ztna.ga"]

groups = ["oauthTest1"]
```

FIG. 9

Parser Grammar

```
{
  "accessRules": [
    {
      "ruleType": "SYNCSEC_STATUS",
      "ruleCondition": "MATCH_ANY",
      "ruleValue": [
        "green",
        "yellow"
      ]
    },
    {
      "ruleType": "OS_TYPE",
      "ruleCondition": "MATCH_NONE",
      "ruleValue": [
        "android",
        "mac"
      ]
    }
  ]
}
```

*FIG. 10*

SOPHOS
CENTRAL
Admin

Zero Trust Network Access

‹ Back to Overview

- Dashboard
- Alerts
- Reports

- User Groups
- Devices
- Gateways
- Resources & Access
- Policies
- Identity Providers

Zero Trust Network Access - Policies
Overview / Zero Trust Network Access Dashboard / Policies Help ˅ Hermione Granger ˅
Hogwarts - Super Admin

[Search 🔍]

[Add policy] | [Delete]

Note: Policies are assigned to resources. You can assign users at the resource level. Download Sophos Endpoint agent from the Downloads page. Learn more

Zero Trust - Resources access (4)

| Name | Status | # Resources | Last Modified |
|---|---|---|---|
| High business impact | ✓ Enforced | 21 | Mar 19, 2020 |
| Low business impact | ✓ Enforced | 33 | Mar 19, 2020 |
| Medium business impact | ✓ Enforced | 68 | Feb 11, 2021 |
| Medium business impact with agent | ✓ Enforced | 77 | Mar 19, 2020 |

*FIG. 11*

| | Name ▽ | Status | FQDN ▽ | Type ▽ | Version ▽ | # Resource ▽ | # Active users ▽ |
|---|---|---|---|---|---|---|---|
| | [Add gateway] | | | | | [Search] | |
| | ▽ Show filters | | | | | | |
| ▽ ○ | Burlington (5) | Gateway degraded | connect1.co.com | ESXi | Update failed | 77 | 54 |
| | ↳ gw1.local | Active: 1 month 2 hrs | | | 1.3 | | |
| ⊘ | ↳ gw2.local | Inactive: 3 months | | | 1.1 | | |
| | ↳ gw3.local | Active: 2 month 4 hrs | | | 1.3 | | |
| | ↳ gw4.local | ○ Generating image | | | | | |
| | ↳ gw5.local | ↓Download S3 image Ready for deployment | | | | | |
| ▽ | Burlington2 (3) | Gateway cluster active: 2 weeks 5 hrs | connect2.co.com | ESXi | 1.3 | 32 | 23 |
| | ↳ gwbu2_1.local | Active: 2 weeks 5 hrs | | | 1.3 | | |
| | ↳ gwbu2_2.local | Active: 2 weeks 3 hrs | | | 1.3 | | |
| | ↳ gwbu2_3.local | Active: 2 weeks 3 hrs | | | 1.3 | | |
| | UK (1) | Waiting for deployment | | AWS | | | |
| | ↳ gwuk1.local | ○ Generating CFT | | | | | |
| ▽ | Ahmedabad (1) | Approve (Ready for connection) | connect3.co.com | ESXi | 1.3 | | |
| | ↳ gwabd1.local | Waiting for gateway approval | | | | | |
| ▽ ○ | Vancouver (3) | Gateway cluster inactive: 1 hr | connect4.co.com | ESXi | ⊕ 1.2 | | |
| ⊘ | ↳ gw1.local | Unknown | | | | | |
| ⊘ | ↳ gw2.local | Unknown | | | | | |
| ⊘ | ↳ gw3.local | Unknown | | | | | |
| ▷ | Germany (1) | Gateway active: 2 weeks 5 hrs | connect2.co.com<br>footer/pagination | AWS | 1.3 | 32 | 23 |

*FIG. 14*

NETWORK CONFIGURATION UPDATE

CROSS-REFERENCE TO RELATED APPLICATIONS

This application is a bypass continuation that claims priority to International Patent Application No. PCT/US22/18635 filed on Mar. 3, 2022, which claims priority to Indian Patent Application No. 202111047216 filed on Oct. 18, 2021, and U.S. Provisional Patent Application No. 63/271,652 filed on Oct. 25, 2021, where each of the foregoing applications is hereby incorporated by reference in its entirety.

BACKGROUND

There remains a need for improved techniques for deploying and managing zero trust network access gateways, or similar cloud-based and/or authentication-based enterprise resources, particularly when deployed as a cloud-based cluster of nodes.

SUMMARY

A cluster of nodes are sequentially updated with new network configuration settings in order to maintain availability of the cluster during the update. In the sequential update, each node conditionally updates network configuration settings, tests connectivity, and retains an update to the configuration only if the node is able to restore connectivity suitable for operation in the cluster.

In one aspect, a method disclosed herein may include: receiving a request to update network configuration settings for a plurality of nodes in a cluster; selecting a node from the plurality of nodes for an incremental update; isolating the node from the cluster while continuing to operate the cluster with the remaining plurality of nodes; updating the network configuration settings with an update for the node; testing a connectivity of the node with the update; and returning the node to the cluster with the update if the connectivity passes one or more tests.

Implementations may include one or more of the following features. The method may further include rolling back the update and returning the node to the cluster without the update if the connectivity does not pass the one or more tests. Testing the connectivity of the node with the update may include testing a connection to one or more resources configured locally on a gateway. Testing the connectivity of the node with the update may include testing a connection to a resource administratively configured for testing connections of nodes. Testing the connectivity of the node may include configuring the node to autonomously perform a connectivity test and conditionally accept the update based on a result of the connectivity test. The method may further include returning a failed changelog to an administrator if the connectivity does not pass the one or more tests. The method may include sequentially updating the network configuration settings for each of the plurality of nodes in the cluster. The cluster of nodes may operate as a network appliance. The cluster of nodes may operate as a zero trust network access gateway.

In one aspect, a computer program product disclosed herein may include computer executable code that, when executing on one or more computing devices forming a computing cluster for a network appliance, perform the steps of: receiving a request to update network configuration settings for a plurality of nodes in a cluster; selecting a node from the plurality of nodes for an incremental update; isolating the node from the cluster while continuing to operate the cluster with the remaining plurality of nodes; updating the network configuration settings with an update for the node; testing a connectivity of the node with the update; and returning the node to the cluster with the update if the connectivity passes one or more tests.

Implementations may include one or more of the following features. The computer program product may further include code that performs the step of rolling back the update and returning the node to the cluster without the update if the connectivity does not pass the one or more tests. Testing the connectivity of the node with the update may include testing a connection to one or more resources configured locally on a gateway. Testing the connectivity of the node with the update may include testing a connection to a resource administratively configured for testing connections of nodes. Testing the connectivity of the node may include configuring the node to autonomously perform a connectivity test and conditionally accept the update based on a result of the connectivity test. The computer program product may further include code that performs the step of returning a failed changelog to an administrator if the connectivity does not pass the one or more tests. The computer program product may further include code that performs the step of sequentially updating the network configuration settings for each of the plurality of nodes in the cluster. The cluster of nodes may operate as a zero trust network access gateway. The computer program product may further include code that performs the step of updating two or more of the plurality of nodes concurrently.

In one aspect, a system disclosed herein may include: a network appliance for an enterprise network, the network appliance configured in a cluster of nodes each similarly configured to support network functions; a data store storing an update to network configuration settings for the cluster; and a threat management facility configured to provide a user interface for receiving an update request from a network administrator to perform the update to the cluster of nodes. The threat management facility may be further configured to respond to the update request by automatically and sequentially updating network configuration settings for each node in the cluster by selecting one of the nodes for an update; isolating the node from the cluster while continuing to operate the cluster with the remaining plurality of nodes; updating the network configuration settings with an update for the node; testing a connectivity of the node with the update; and returning the node to the cluster with the update if the connectivity passes one or more tests. The system may further include an update agent executing on each node in the cluster, the update agent responsive to the threat management facility to update the network configuration settings according to the update. The network appliance may be a zero trust network access gateway.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 9 illustrates a policy file.

FIG. 10 illustrates a parser grammar set for a security policy.

FIG. 11 illustrates a user interface for configuring security policies.

FIG. 14 illustrates a user interface for updating network appliances.

DETAILED DESCRIPTION

Figure 1:
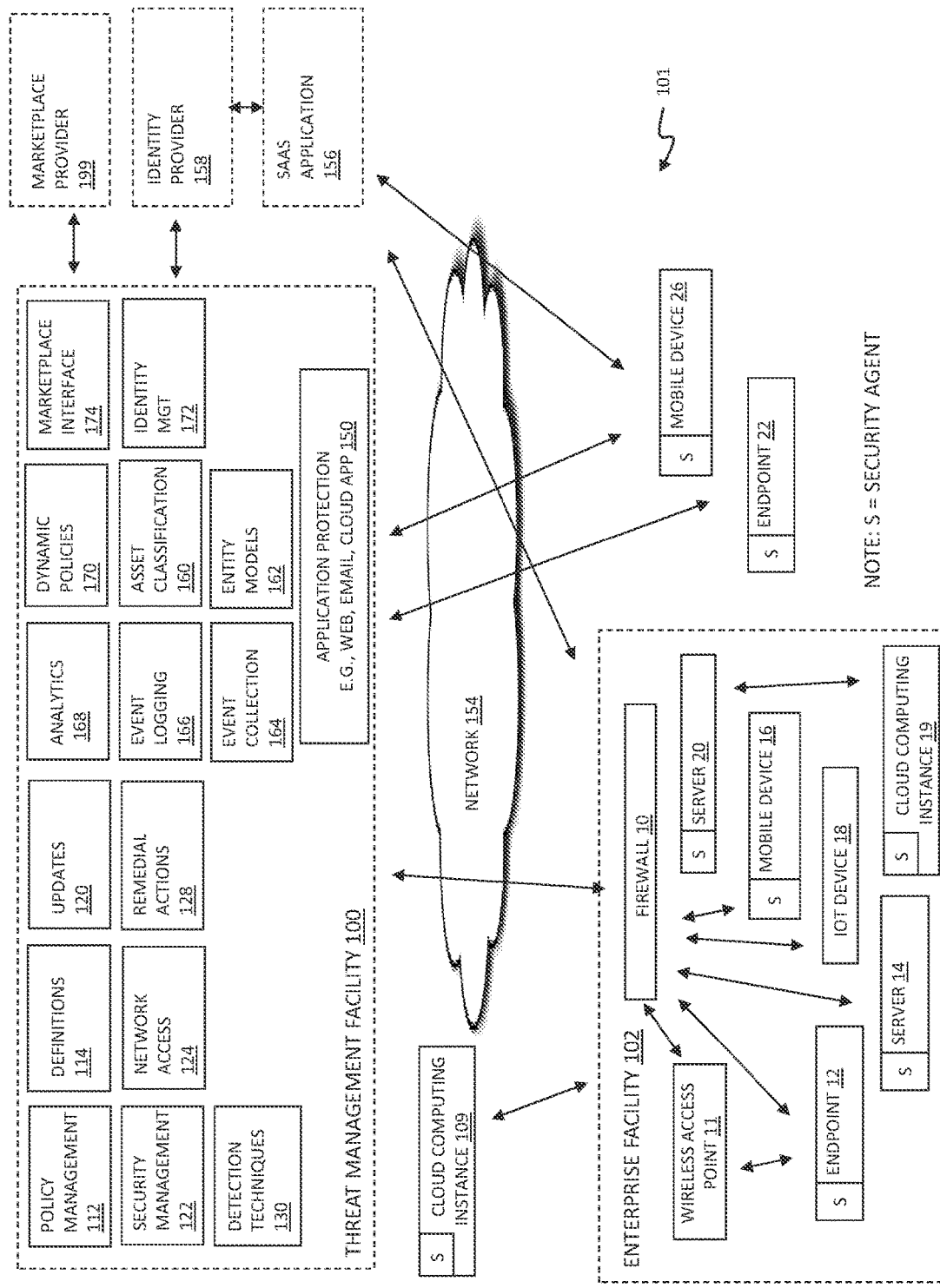
FIG. 1 depicts a block diagram of a threat management system.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

As described herein, a threat management system may use a Sensor, Events, Analytics, and Response (SEAR) approach to protect enterprises against cybersecurity threats.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated and include more compute instances at home and in the cloud, an enterprise facility 102 may also or instead include a personal network such as a home or a group of homes. The enterprise facility's 102 computer network may be distributed amongst a plurality of physical premises such as buildings on a campus and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IoT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, the threat management facility 100 may include, or may be connected to a security agent S such as a local security agent deployed on one or more other entities within the threat management system 101. The facilities of the threat management facility 100, and/or a security agent S therefor, may be deployed on the same physical hardware or logical resource as a gateway for an enterprise facility 102, a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network, or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware, and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 90 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a blacklist, an allowed list, a whitelist, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 9, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 92 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 92 and policy management facility 112 may push information to the enterprise facility 102 network and/or the compute instances 10-26, the enterprise facility 102 network and/or compute instances 10-26 may pull information from the security facility 92 and policy management facility 112, or there may be a combination of pushing and pulling of information. For example, the enterprise facility 102 network and/or compute instances 10-26 may pull update information from the security facility 92 and policy management facility 112 via the update facility 120, an update request may be based on a time period, by a certain time, by a date, on demand, or the like. In another example, the security facility 92 and policy management facility 112 may push the information to the enterprise facility's 102 network and/or compute instances 10-26 by providing notification that there are updates available for download and/or transmitting the information. In an embodiment, the policy management facility 112 and the security facility 92 may work in concert with the update management facility 90 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 94 may restrict access to certain applications, networks, files, printers, servers, databases, and so on. In addition, the network access facility 94 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 94 may determine if a given compute instance 10-22 should be granted access to a requested network location, e.g., inside or outside of the enterprise facility 102. Network access facility 94 may determine if a compute instance 22, 26 such as a device outside the enterprise facility 102 may access the enterprise facility 102. For example, in some cases, the policies may require that when certain policy violations are detected, certain network access is denied. The network access facility 94 may communicate remedial actions that are necessary or helpful to bring a device back into compliance with policy as described below with respect to the remedial action facility 128. Aspects of the network access facility 94 may be provided, for example, in the security agent of the endpoint 12, in a wireless access point 11, in a firewall 10, as part of application protection 150 provided by the cloud, and so on.

In an embodiment, the network access facility 94 may have access to policies that include one or more of a block list, an allowed list, an unacceptable network site database, an acceptable network site database, a network site reputation database, or the like of network access locations that may or may not be accessed by the client facility. Additionally, the network access facility 94 may use rule evaluation to parse network access requests and apply policies. The network access rule facility 94 may have a generic set of policies for all compute instances, such as denying access to certain types of websites, controlling instant messenger accesses, or the like. Rule evaluation may include regular expression rule evaluation, or other rule evaluation method (s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 92 may take any steps or deploy any measures suitable for addressing a detection of a threat, potential threat, policy violation or other event, code or activity that might compromise security of a computing instance 10-26 or the enterprise facility 102.

Figure 2:
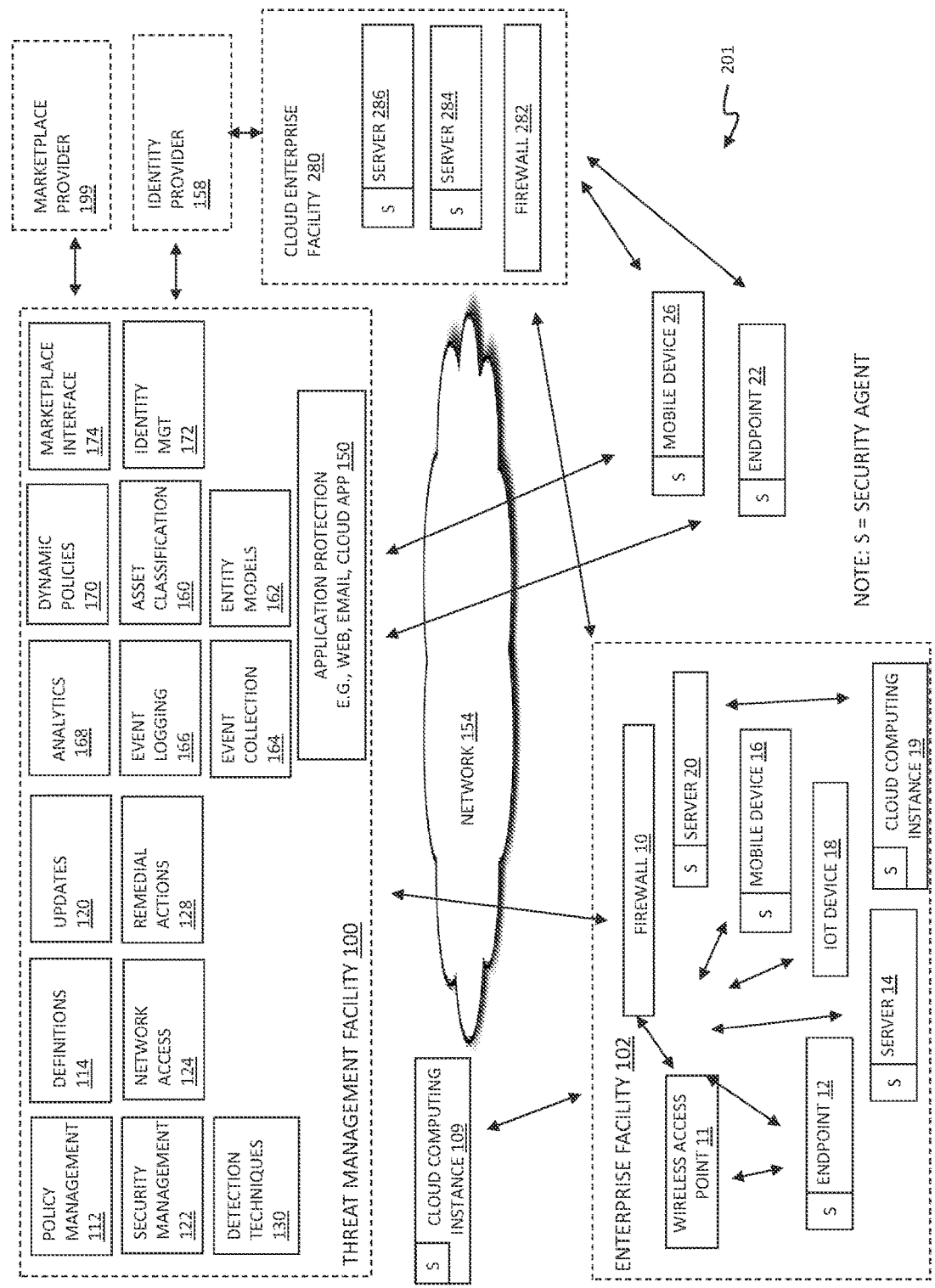
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
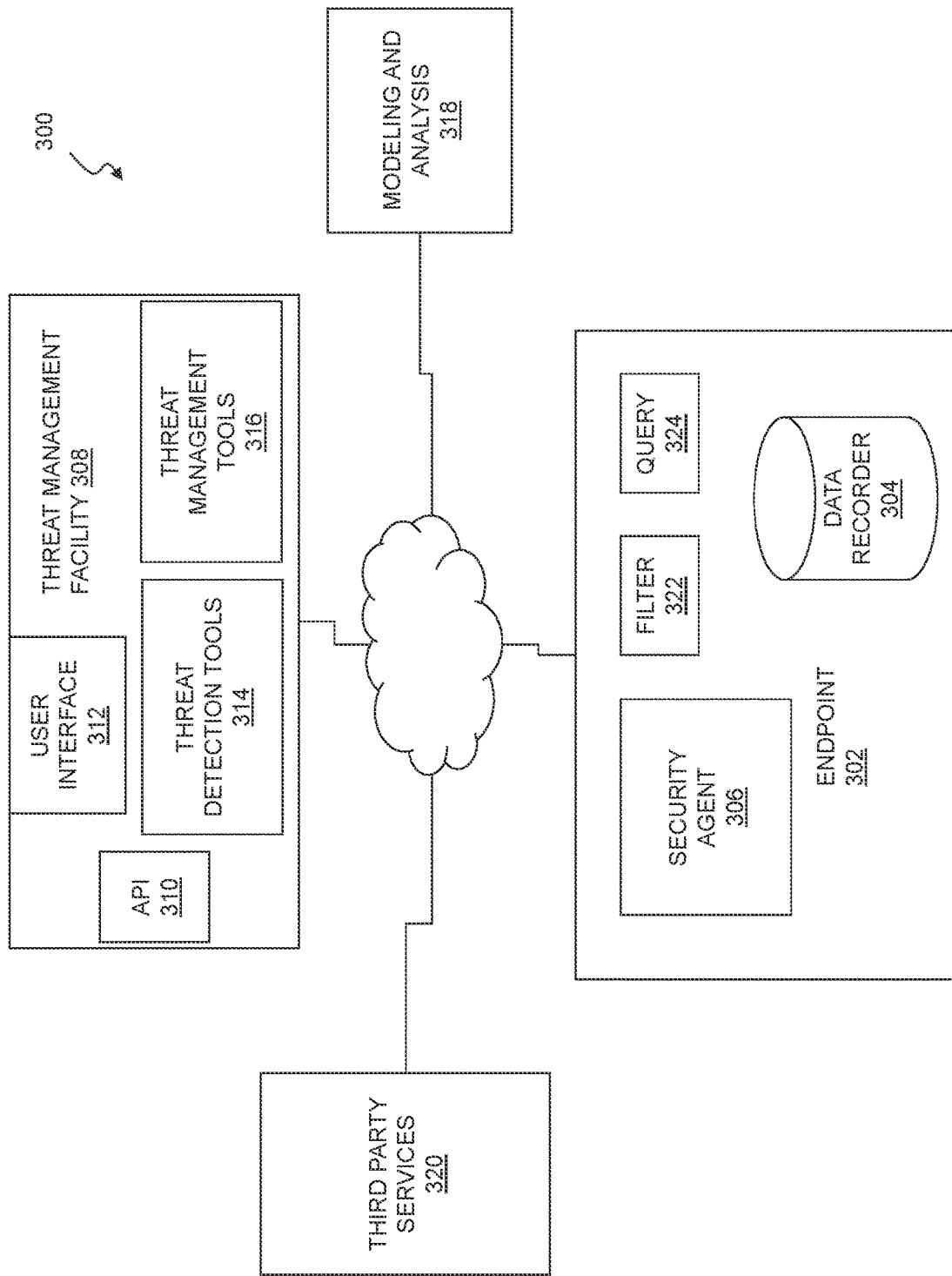
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers, and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches, and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network, and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
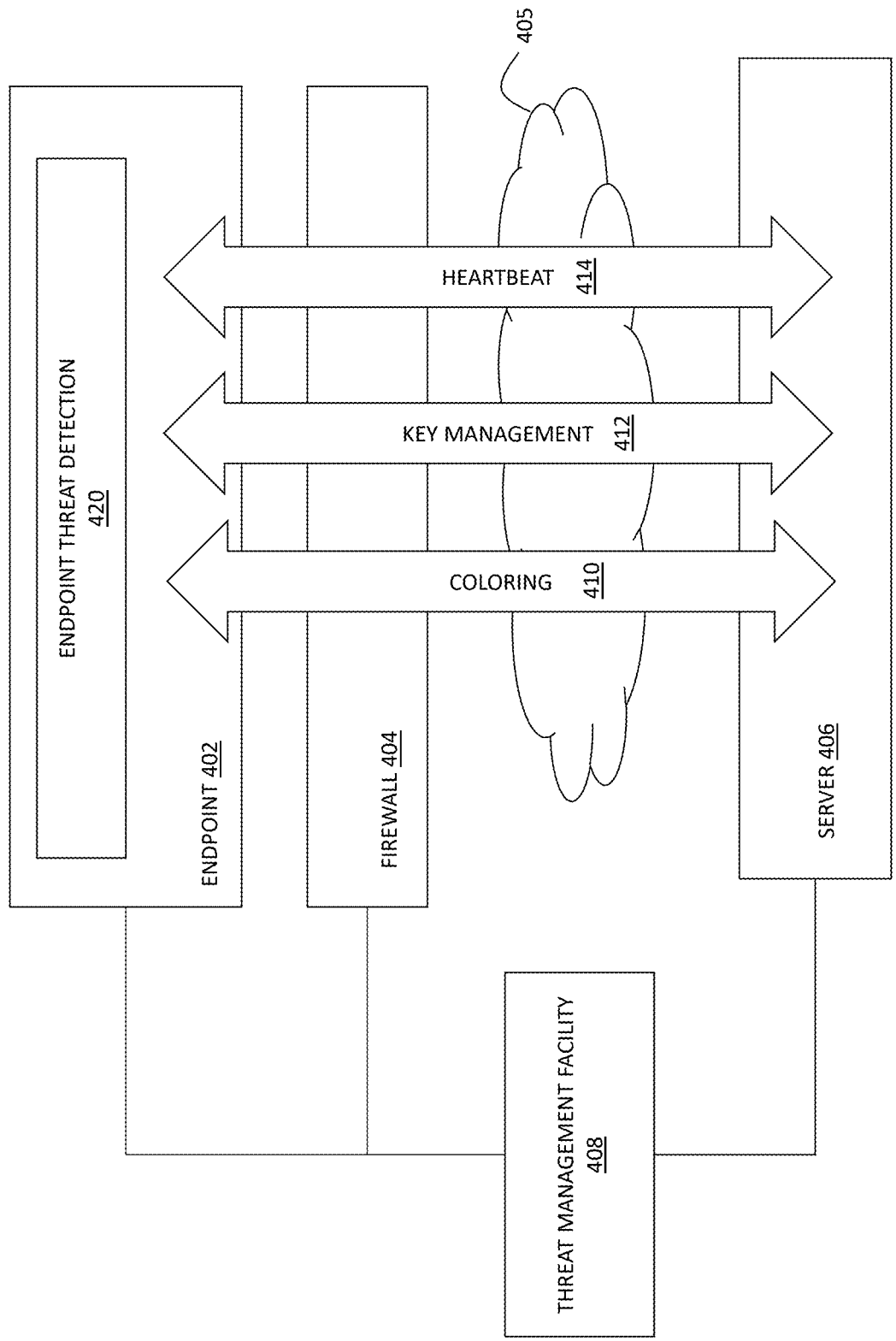
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted, or otherwise modified. More generally, the cooperation of these systems enables a wide variety of reactive measures that can improve detection and remediation of potential threats to an endpoint.

Figure 5:
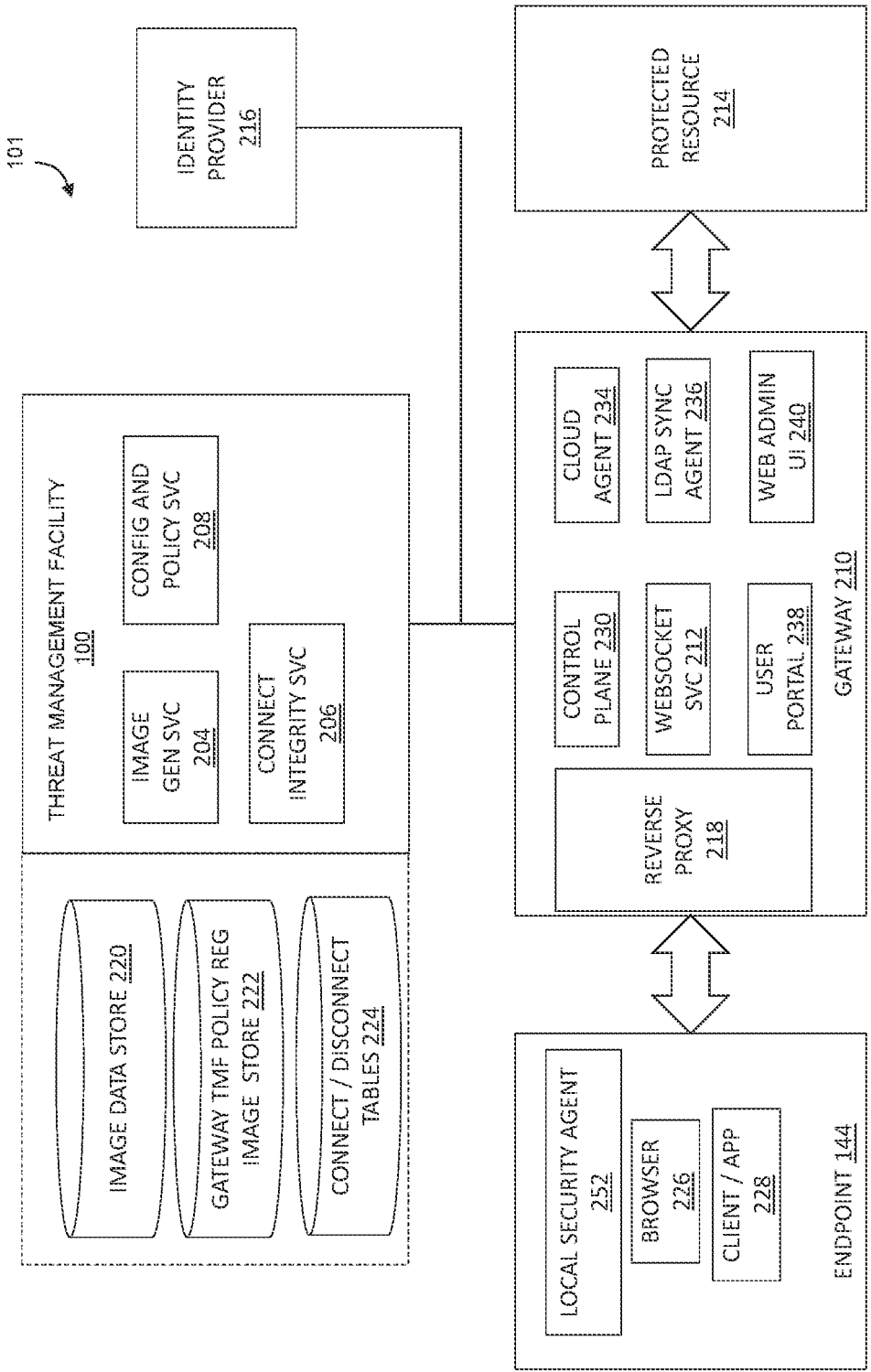
FIG. 5 shows a threat management facility in a zero trust network access environment.

FIG. 5 shows a threat management facility in a zero trust network access (ZTNA) environment. In a zero trust network access environment for a system 101 such as an enterprise network, an endpoint 144 may be separated from a protected resource 214 such as an application or data store by a gateway 210. In general, the gateway manages access to the protected resource 214, and the threat management facility 100 provides security services for the enterprise network as generally described herein.

In embodiments, a threat management facility 100 such as any of those described herein may be adapted, may be integrated with, or may operate as a component of a system/service that provides central control of security and operational features of a ZTNA deployment. Thus, a threat management facility 100 may include a ZTNA-enabled threat management facility that manages endpoints and resources within a ZTNA environment. As described herein, this may include management of services such as an image generation service 204 for facilitating instantiation, registration, and/or configuration of a new ZTNA gateway for providing secure access to a protected resource 214. The protected resource 214 may, for example, include an enterprise software application, a remote service, a cloud data storage resource, a remote database, and the like. The threat management facility 100 may, for example, include a configuration and policy service 208 that facilitates establishing system resource configuration and security policies for the enterprise network.

The threat management facility 100 may communicate with other elements of a ZTNA threat management architecture through a network, such as an enterprise network, the Internet, or the like. In one aspect, the threat management facility 100 may instantiate a gateway 210 using the image generation service 204 and provide polices and the like to manage operation of the gateway 210 consistent with polices for the enterprise network. The gateway 210, or portions thereof, may be instantiated for providing secure access to a protected resource 214.

The gateway 210, as instantiated, may provide secure connectivity for client devices, such as an endpoint 144, to a protected resource 214 via, for example a WebSocket service 212 and a client access port, such as a reverse proxy 218. The gateway 210 may facilitate establishing and maintaining a connection with an endpoint-deployed local security agent 252 that is adapted for operation in a ZTNA environment. Services operating on the gateway 210 may support enterprise threat management and access to protected resources. In general, a ZTNA environment relies on authentication of endpoints 144 on a resource-by-resource basis. To this end, the system 101 may include an identity provider 216 that supports, e.g., secure, credential-based authentication of entities within the zero trust network environment.

The threat management facility 100 may include one or more of an image generation service 204, a configuration and policy service 208, or a connection integrity service 206. Each of these services are described further herein. Each of these services, individually or in any combination, may be provided by a computing system of the threat management facility 100, which may be physically hosted by an enterprise, hosted in a cloud-based computing environment, or some combination of these, and may be available to administrators and other users through a web server interface or the like. In one aspect, services used by the threat management facility 100 may also be deployed as protected resources within the zero trust network environment, e.g., as applications served in a cloud-based environment within a ZTNA architecture. These services may perform functions described below while taking advantage of the security benefits of both a zero trust network environment and a threat management facility 100. As an example, a connection integrity service 206 may rely on the configuration and policy service 208 for connection integrity conditions and remediation actions (e.g., connection time-out limits and the like).

The threat management facility 100 may further be constructed with and/or provide access to various data storage facilities, such as a gateway image data store 220 of gateway instantiation/update data structures. A gateway registration storage facility 222 (or optionally an extension of the image data store 220) may store gateway-specific configuration and/or registration images or portions thereof for use by an instantiated gateway 210 during threat management configuration, registration as a ZTNA gateway, and the like. Exemplary threat management functions that may be imposed on a gateway through use of an image from the gateway registration storage facility 222 may include automatic loading of preconfigured threat management policies and registration of the gateway 210 with the threat management facility 100 as a component of an enterprise network management platform. As an example, a mountable image in the gateway registration storage facility 222 may be accessed by a newly instantiated gateway 210. This registration storage facility 222 may also be used to store mountable image templates, gateway registration/configuration setup scripts, rules (e.g., registration rules, gateway mountable image generation rules and the like) as well as prior revisions of gateway instantiation-specific configurations and the like that may be used by, for example, the image generation service 204. In embodiments, the image generation service 204 may include or have access to a user interface (not depicted) through which gateway images can be specified, configured, maintained, accessed, and managed by a user such as an administrator. Optionally, the image generation service 204 may provide access to user interface screens, templates, workflows, and the like for use within a user interface of the threat management facility 100 for gateway image specification, maintenance, and the like.

In one aspect, the threat management facility 100 may include and/or provide access to data structures for managing connection integrity, such as the connection data storage facility 224. This facility 224 may include one or more lists/tables of connections between users/endpoints 144 and protected resources 214. The connection data storage facility 224 may also or instead include one or more of lists/tables of disconnections. In embodiments, the connection integrity service 206 may maintain the data in this storage facility 224 (e.g., the exemplary connection and disconnection lists) for managing and/or monitoring the integrity of connections between end users and protected resources. In an example, data representative of a connection established through a WebSocket service of the ZTNA architecture may be stored in the connection data storage facility 224 as one or more entries in a connection and/or disconnection list. Other types of data that may be stored in the connection data storage facility 224 may include connection histories, connection integrity rules, policies, algorithms, and the like.

In embodiments, the connection integrity service 206 may interface with the connection integrity data storage facility 224. While depicted in FIG. 5 as elements of the threat management facility 100, either or both connection integrity elements may be provided through one or more services or network resources that are external to the threat management facility 100. As an example, the connection integrity service 206 may be a first protected resource and the connection integrity data storage facility 224 may be a second protected resource of a ZTNA architecture. Further, it is contemplated that various combinations of integrated and external elements of the threat management facility 100 can be embodied, such as an integrated connection integrity service 206 and a remotely accessible connection integrity data storage facility 224.

Regarding the image generation service 204, before a gateway can be registered for providing secure connection services and/or threat management services, the gateway must be configured and instantiated. To this end, an administrator may interface with the threat management facility 100 and enter/select details of the gateway. These details may include, without limitation a gateway name, a Fully Qualified Domain Name (FQDN), certificates, a One Time Password (OTP), identity providers to use for authentication, and the like. Depending on the deployment platform (e.g., VMWare, HyperV, AWS, Azure, GCP, and the like), the image generation service 204 may be configured to generate a deployment-formatted image. Suitable image formats may, for example, include an OVF format for VMware or Hyper V or a Terraform template for AWS, Azure, or GCP. the like. The administrator can direct delivery of a configured image to the corresponding deployment platform for installing an instance of the gateway.

The threat management facility 100 may also provide a range of administrative services including configuring gateways, managing protected resources, configuring identity providers, monitoring ZTNA appliances, creating notifications, generating reports, managing users, and the like. These and other administrative services may be performed and/or managed through one or more user interfaces provided by threat management facility 100. An exemplary service is a configuration and policy service 208, which may handle security configuration for entities in a ZTNA system such as identity providers 216, gateways 210, and users, e.g., through policy objects, application definitions, policies, and so forth. In embodiments, configuration of identity providers may be based on enterprise policies. In general, the threat system 101 may use a single identity provider 216 for all users, or a variety of identity providers, such as for partners, contractors, different parts of an enterprise and the like. Thus, the configuration and policy service 208 may handle multiple identity provider configurations.

The configuration and policy service 208 may facilitate adding a gateway by providing data structures that define application-to-front end security, threat management policy, and related configuration details (e.g., default parameter values, static parameters, and the like). The configuration and policy service 208 may also or instead use policy objects, such as reusable objects in application policy rules. Exemplary policy objects include at least two types of policy objects; lists and expressions. In embodiments, lists can be used to store sequences of values, whereas expressions can store sequences of conditions to be evaluated. Other aspects of configuration and policy may include application details of the protected resource, such as FQDN and/or IP addresses, port numbers, protocols, and gateway identifiers to identify one or more gateways to be used for accessing an application. As an example, an application policy may include details of constraints under which access to an application (e.g., protected resource 214) is allowed or denied. These constraints could be based on several variables associated with an attempt at accessing the protected resource including identity of a user attempting the access, groups that the user belongs to, a device type or OS through which the user is making the access attempt, device posture information including security status or health status, and the like.

In embodiments, the gateway 210 may operate as a data plane element for the ZTNA system, and may handle traffic destined for protected resources 214 while facilitating user authentication for connecting to the resource (typically an application) as well as applying policies for authorizing such requests. The gateway 210 may also be adapted for operation in a managed enterprise network environment that provides centralized threat management. In embodiments, the gateway 210 may receive configuration, policy, threat management, and enterprise network management data from a control plane element, such as threat management facility 100.

The gateway 210 may be configured with a reverse proxy 218, a WebSocket service 212, a control plane interface 230, a cloud agent 234, a LDAP sync agent 236, an update agent 240, a user portal 238, a web admin user interface 240, and other features.

In embodiments, a reverse proxy 218 is the primary point of entry into the gateway 210 for traffic that accesses and/or interacts with the protected resource 214. The reverse proxy 218 provides, among other things, virtual host definitions for the protected resource 214 while acting as a proxy for traffic destined for the protected resource/application 214. In embodiments, a reverse proxy can provide a secure HTTPS connection terminus for applications, such as applications that support only HTTP. The reverse proxy 218 may further coordinate with authentication and authorization services to facilitate authenticating users as well as verifying if a request for access is allowed based on access and/or security policies associated with the protected resource 214.

In embodiments, a WebSocket service 212 may provide support for, among other things, TCP/UDP/ICMP traffic applications (like SSH, RDP, SNMP, Ping etc.). The WebSocket service 212 may also support browser-based application access to protected resources 214. An agent-based interaction with an agent operating on an endpoint may be provided from the gateway 210. In agent-based cases, the endpoint agent, such as a local security agent 252 on the endpoint 144 may establish a tunnel interface with the WebSocket service 212 of the gateway 210 so that traffic for the protected resource 214 can be sent over an encrypted WebSocket channel. In an example, on the gateway, the reverse proxy 218 may allow the WebSocket traffic to flow to the WebSocket server 212 if the user has been authenticated. The WebSocket server 212 may apply further authorization checks to see if the user is permitted access to the protected resource 214.

Other gateway 210 services and elements may include an LDAP sync agent 236 that ensures that identity information is maintained throughout the architecture for use by hosted identity services, such as Active Directory or LDAP, and the like. In embodiments, the LDAP sync agent 236 may periodically fetch relevant identity information so that all relevant instantiated elements (e.g., the control plane and the like) can have the changes that were made since the previous sync.

In embodiments, a cloud agent module 234 may be responsible for getting the latest configuration from an administrative entity such as threat management facility 100 as well as sending logging, reporting, and monitoring data as needed. Upon receiving configuration data, the cloud agent module 234 may store the configuration data and send notifications for any related modules to reload the stored configuration data. The cloud agent module 234 may also be responsible for translating policy definitions to various query languages, such as to a Rego policy language.

The gateway 210 may be configured with a control plane service 230. Whenever a new protected resource 214 is added by the administrator or, for example, the security material (e.g., certificate and/or private key data) for the gateway 210 is changed, the gateway 210 would need to reload the configuration. Similarly, changes in application policy would require a reload of policy data. The control plane service 230 supports refreshing configuration and policy for a gateway 210 through an external service, such as an Application Programming Interface (API). A refresh may be based on a scheduled poll for changes, or any other periodic or other scheduled or ad hoc basis. The control plane service 230 may support refresh including a poll-based refresh. In embodiments, the control plan service 230 may facilitate interfacing with a ZTNA central controller, such as threat management facility 100 as described herein by implementing interfaces such as remote procedure call (e.g., gRPC), representational state transfer (e.g., REST) and the like.

Another gateway element is a user portal 238. In embodiments, the user portal provides a web-based console where an authenticated user can browse accessible protected resources 214 as well as access them using bookmarks. The user portal module 238 may include user interface assets to render, for example user portal web pages as well as support backend functionality to provide access to the protected resources 214.

The gateway 210 may include a web administrator user interface 240. The administration user interface 240 may expose metrics related to the gateway 210 as well as troubleshooting interfaces useful to an administrator or the like for investigating network usage, error messages, log files, and the like. The user interface 240 may be exposed through a web server, such as one that serves HTML/JS/CSS resources.

Protected resources 214 may be accessed through an endpoint 144, such as any of the endpoints described herein. The endpoint 144 may include a local security agent 152 also as described herein. When configured for threat management in a ZTNA architecture, the local security agent 152 may communicate with the gateway 210. A ZTNA-adapted local security agent 252 may communicate information to the gateway 210 such as device posture (e.g., security and threat-related status of the endpoint, and the like) continuously or on any periodic or aperiodic basis. This posture may be used for compliance with authorization policies of the enterprise network and/or the zero trust network environment, as managed by the threat management facility 100.

For legacy endpoint-executed applications 228 that may be accessing protected resources 214, such as databases and the like, the ZTNA-adapted local security agent 252 may handle both ZTNA compliance and on-endpoint application interfacing. As an example, the local security agent 152 may intercept network-bound traffic from the application 228 and coordinate transfer of that traffic over a secure channel that it established between the endpoint 144 and the gateway 210 rather than allowing the network-bound traffic to be delivered directly over the network from the application 228. Return traffic from the protected resource 214 may be communicated over the established secure channel to the agent 252 where it is converted to application-specific form and delivered locally to the application 228 executing on the endpoint 144.

In one aspect, a ZTNA architecture can be operated without an endpoint agent, such as for web browser-based applications (e.g., web server executed applications and the like that interface with the endpoint through the browser 226) where a secure channel can be established between a web browser 226 and the gateway 210 using SSL and/or other types of secure tunneling. However, lack of a local agent, such as an adapted local security agent 252, may limit the extent of threat management that can be performed on the endpoint 144 in a ZTNA architecture or the use of web-based network resources. Therefore, a ZTNA-adapted local security agent 252 may be configured to provide threat and network management services (e.g., comparable to those of a local security agent 152) for the endpoint 144 independent of the type of client software being used on the endpoint 144, or alternatively, to provide such services in those contexts where an application cannot independently secure a connection to the gateway 210. In embodiments, the local security agent 252 may be configured to monitor and/or ensure enterprise threat management for both agentless (e.g., web browser like) and agent-based (e.g., native app-based) access to protected resources 214 in the context of a ZTNA environment.

Figure 6:
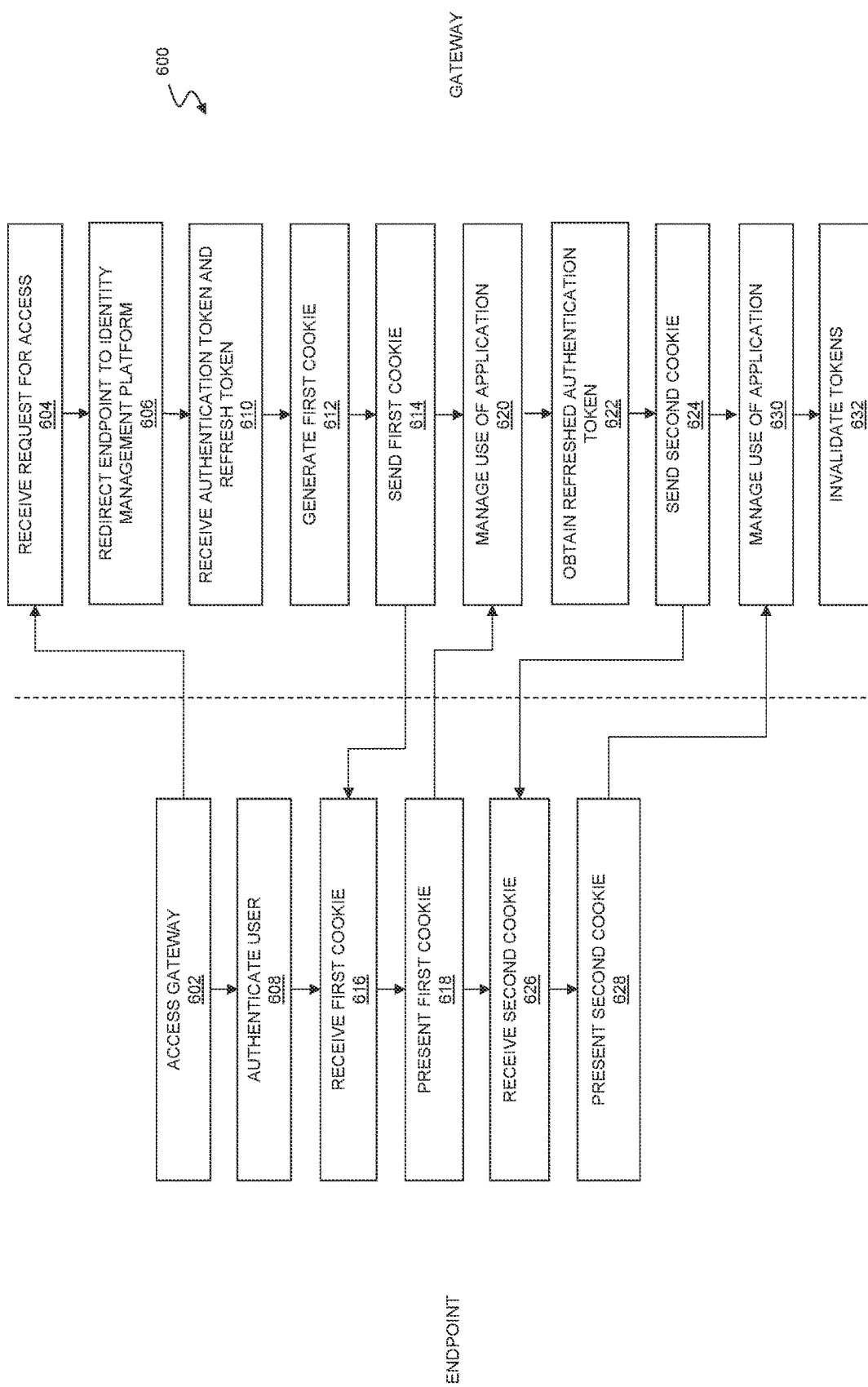
FIG. 6 illustrates a method for authenticating a user for access to an application.

FIG. 6 illustrates a method for authenticating a user for access to an application. In a ZTNA network, users are only provided access to an application on the network after an identity provider has specifically authenticated the user for that application and granted the user access. After the user has been authenticated, a ZTNA gateway may receive an access token from the authenticating identity provider and send a corresponding cookie to the user's device to store the user's authenticated session. However, cookies typically have an expiration date and time, after which the user will have to reauthenticate and obtain a new session cookie. The reauthentication may interrupt the user's session, potentially interrupting the user's current interaction with an application. It may be advantageous, then, to silently reauthenticate the user with authentication and refresh tokens from the identity provider in order to extend the current session without interrupting a user's experience within a current application session.

As shown in step 602, the method 600 may include accessing a gateway through a network from an endpoint. A user at the endpoint may access a gateway on any user device with suitable network capabilities. In some embodiments, the gateway may be a ZTNA gateway hosted on a cloud computing platform or any other platform suitable for hosting gateway devices.

As shown in step 604, the method 600 may include receiving a request at the gateway from a user of an endpoint for access to an application managed by the gateway. The user may send an application request to the gateway for authentication. The gateway may include a reverse proxy server to receive requests from users and to send the authentication request to an authentication component at the gateway. During this time, the connection between the user and the network may be temporarily paused.

As shown in step 606, the method 600 may include redirecting the endpoint to an identity management platform for authentication of the user. The authentication component may initially check if a session cookie is already present on the endpoint and/or valid. If so, the user does not have to be reauthenticated. Otherwise, the gateway may direct the user with a callback URL to a session page that redirects the user to an identity management platform for authentication. The identity management platform may be an identity provider that provides user authentication services within an enterprise network, or an independent third-party identity management platform used by the enterprise network for authentication functions.

As shown in step 608, the method 600 may include authenticating a user of the endpoint for access to an application through the gateway based on user credentials managed by an identity management platform. The identity management platform may direct the user to a sign-in page where the user can enter their credentials. The identity management platform may also prompt the user with additional security challenges such as with multi-factor authentication using an online authenticator, email authentication, text message authentication, security questions/phrases, biometric authentication, one-time passcodes, or any other additional authentication factor(s) suitable for the desired level of security for the application. After the user enters their credentials (and provides any additional authentication factors), the platform may determine an appropriate level of access to grant the user. For example, the determination may be a binary decision (yes/no). Alternatively, the platform may assign the user a degree of access demarked by a security level. The platform may then redirect the user back to the session page with a notification at the endpoint of the access level.

As shown in step 610, the method 600 may include receiving an authentication token and a refresh token created by the identity management platform. During the authentication process, the gateway may send a request for an authentication token and a refresh token to the identity management platform. The platform may issue an authentication token and a refresh token to the gateway after the user successfully authenticates. The authentication token may be used by the gateway (or other entities) on behalf of the user to verify the user identity and obtain other user information from the identity management platform. Each authentication token has an expiration time, and the refresh token can be used by the gateway to fetch a new authentication token upon expiration without requiring re-authentication by the user. In a typical security configuration, an authentication token from an identity management platform may have a valid time of an hour or less. If a user session is active during a window around the expiration time, the gateway can refresh the authentication token using the refresh token in order to obtain a new authentication token with a new expiration time. Otherwise, the session will typically lapse, preventing further activity by the user in the corresponding session.

As shown in step 612, the method 600 may include generating a first cookie for access to the application by the user. The first cookie may identify a session for use of the application, along with a session time and/or other session information. The first cookie may, for example, be a text file with name-value pairs identifying various parameters of the session, including the user credentials, the session time, the application the user has been granted access to, user preferences, and the access level of the user. The gateway may generate the first cookie at the authentication component and direct it towards the reverse proxy server. The session cookie, or portions thereof, may be encrypted, cryptographically signed, or otherwise secured against tampering and malicious re-use.

As shown in step 614, the method 600 may include sending the first cookie to the endpoint, e.g., with the reverse proxy server of the gateway.

As shown in step 616, the method 600 may include receiving the first cookie at the endpoint from the gateway. After the endpoint receives the first cookie, the endpoint may store the first cookie on the endpoint device for the duration of the session time of the first cookie. The cookie may, for example, be stored in a browser cache, a cache for a local security agent on the endpoint, or any other location consistent with use in a ZTNA environment as described herein.

As shown in step 618, the method 600 may include presenting the first cookie to the gateway for use of the application. When a user at the endpoint seeks to use the application, the endpoint presents the first cookie to the gateway. When this occurs during the session time specified for (or within) the cookie, and provided that the user's authentication has not otherwise been explicitly revoked, the gateway can identify the user and the authenticated session based on the cookie and permit access to the application through the authenticated session.

As shown in step 620, the method 600 may include managing use of the application by the user of the endpoint based on the first cookie. During the session time, the first cookie may also inform the gateway of user preferences. For example, the first cookie stored on a browser may store user preferences regarding a news website and inform the gateway that the user prefers sports news over politics. The first cookie then may customize the application experience of the user during the session time. More generally, UI preferences, prior UI state, and other user-specific information may also or instead be stored within the cookie in order to preserve or restore the user experience for the session. In another aspect, the session cookie containing authentication information may be independent of a cookie storing other, ancillary information for the session or the user experience within the session.

As shown in step 622, the method 600 may include during the session, obtaining a refreshed authentication token for the user from the identity management platform with the refresh token, the refreshed authentication token extending a valid time for use of the authentication token. As aforementioned, the authentication token may have a valid time of an hour or less. The identity management platform may issue the refresh token, which may be used to acquire a refreshed authentication token with an extended valid time, such as an additional hour or any other expiration time permitted or supported by the identity management platform.

As shown in step 624, the method 600 may include sending a second cookie to the endpoint with an extended session time permitting continued use of the application by the user after an expiration of the session time based on the refreshed authentication token. In general, the gateway may receive the refreshed authentication token from the identity management platform and then send the second cookie to the endpoint to replace the first cookie.

As shown in step 626, the method 600 may include receiving the second cookie at the endpoint from the gateway, e.g., based on a silent reauthentication of the user with the identity management platform without requiring any additional authentication from the user. The silent reauthentication would not, for example, require a user to re-enter user credentials or provide any additional authentication factors such as a pass code, fingerprint, etc. The second cookie may generally include an extended session time for the application greater than the session time for the first cookie. The second cookie thus permits continued use of the application by the user after an expiration of the session time (for the first cookie) without requesting the user credentials from the endpoint for reauthentication of the user. The user may receive the second cookie from the gateway and store the second cookie at the user device in any suitable location. In one aspect, the second cookie may have an extended session time that extends the session time for the first cookie by a week or less.

In one aspect, the session time for the cookie may be updated independently from the authentication token for the user, provided the gateway continues to refresh the authentication token in cooperation with the identity management platform for the duration of the new session cookie that has been provided to the endpoint. In the event of a failed refresh, the session may be explicitly terminated and/or the gateway may prevent further use of the application regardless of the duration of the cookie. The user may then be requested to reauthenticated with the identity management platform in order to continue using the application.

As shown in step 628, the method 600 may include presenting the second cookie to the gateway for continued access to the application. Each time the user returns to use the application during the extended session time, or if a current application session extends beyond the session time for the first cookie, the endpoint may present the second cookie to the gateway. The gateway may then identify the user and session as previously authenticated with the identity management platform.

As shown in step 630, the method 600 may include managing use of the application by the user of the endpoint based on the second cookie. During the extended session time, the second cookie may also provide the gateway with user preferences or prior state information otherwise previously supported by the first cookie.

As shown in step 632, the method 600 may include invalidating the refreshed authentication token and the refresh token when the user credentials have changed. The identity provider may alert the gateway that the user credentials have changed. The gateway may then invalidate the refreshed authentication token and the refresh token.

Figure 7:
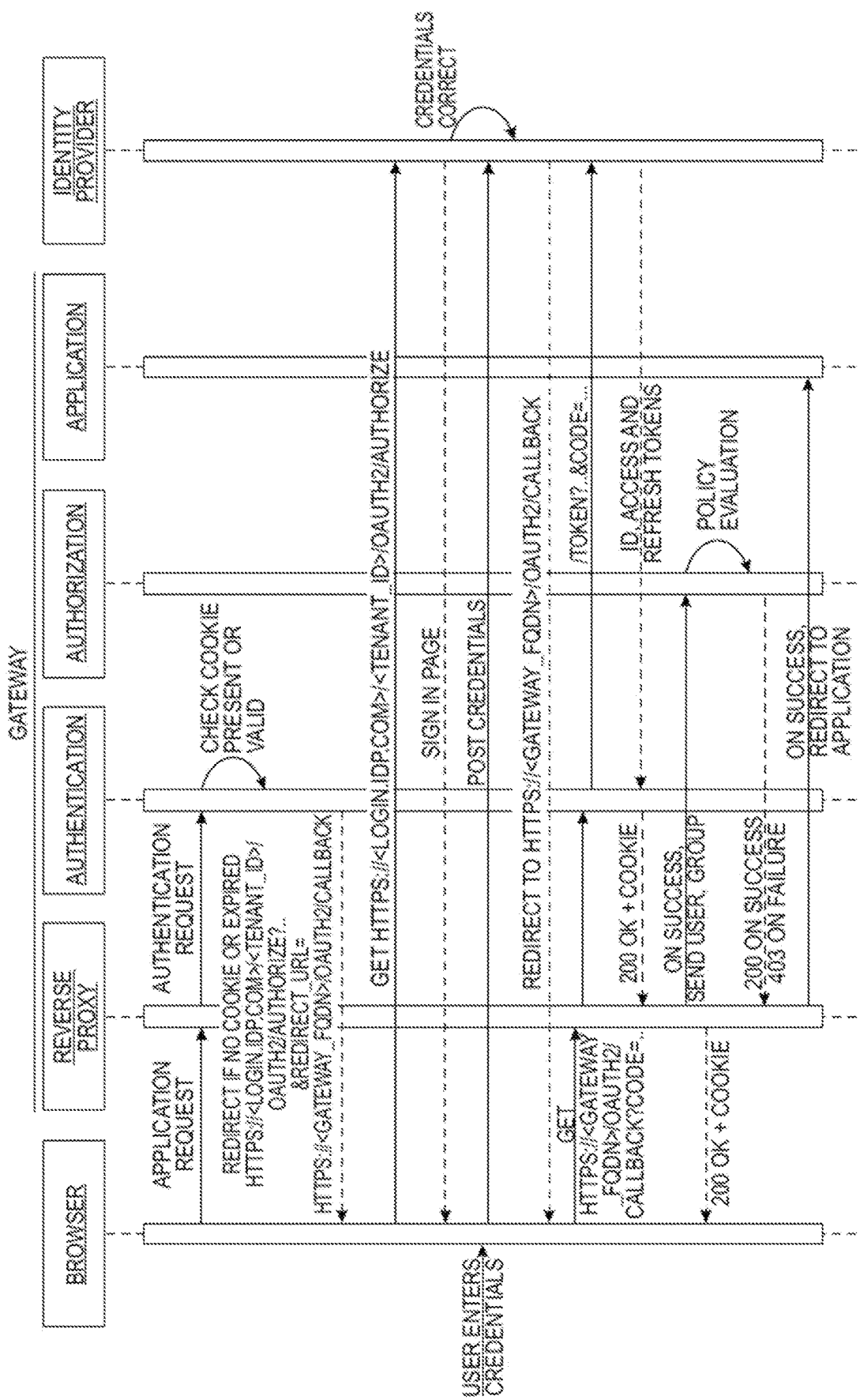
FIG. 7 shows an environment for authenticating a user at a browser for access to an application.

FIG. 7 shows an environment for authenticating a user at a browser for access to an application. The user may be using a browser or other application, client, or the like requesting access to a zero trust network access application on an enterprise network. A gateway such as an application gateway receiving the request may check if a valid cookie is present on the endpoint. If no valid cookie is present, the user may be redirected to a sign-in page maintained by an identity provider. The user may input their credentials at the sign-in page, and provide any additional authentication factors, upon which the identity provider may check if the credentials are correct. If the credentials are correct, the identity provider may redirect the user with a callback URL to a gateway session. The gateway may then send a request to the identity provider for an authentication token and a refresh token for the gateway session. The identity provider may issue the authentication token and the refresh token to the gateway. The gateway may then issue a cookie to the browser for the session after processing the authentication token and the refresh token. The gateway may also or instead evaluate a security policy for managing user access to the application, e.g., according to any security rules or policies maintained by a threat management facility associated with the user and/or application. The gateway may then grant the user access to application and redirect the browser to the application. In the event that a cookie has expired or there is some other session failure, the user/endpoint can be redirected once again to the identity provider in order to re-authenticate before permitting continued use of the application.

According to the foregoing, there is also disclosed herein a computer program product comprising executable code embodied in a non-transitory computer readable medium that, when executing on one or more computing devices, performs the steps of receiving a request from a user of an endpoint for access to an application managed by the gateway; redirecting the endpoint to an identity management platform for an authentication of the user; receiving an authentication token and a refresh token created by the identity management platform; generating a first cookie for access to the application by the user, the first cookie identifying a session for use of the application and the first cookie including a session time for the session; sending the first cookie to the endpoint; managing use of the application by the user of the endpoint based on the first cookie; during the session, obtaining a refreshed authentication token for the user from the identity management platform with the refresh token, the refreshed authentication token extending a valid time for use of the authentication token; sending a second cookie to the endpoint with an extended session time permitting continued use of the application by the user after an expiration of the session time based on the refreshed authentication token; and managing use of the application by the user of the endpoint based on the second cookie.

According to the foregoing, there is also disclosed herein a system comprising for extending a user session in a zero trust network access environment. The system may include an endpoint in a zero trust network access environment; and a zero trust gateway for managing access by a user of the endpoint to a network application. The zero trust gateway may be configured, e.g., by computer executable code stored in a memory of the gateway, to manage an authentication of the user for access to the network application through an identity management platform. The zero trust gateway may be further configured to generate a cookie for access to the network application by the endpoint, to obtain an extended valid time for authentication of the user with the identity management platform using a refresh token from the identity management platform, and to provide an updated cookie to the endpoint extending a session time for the cookie based on the extended valid time for authentication of the user.

Figure 8:
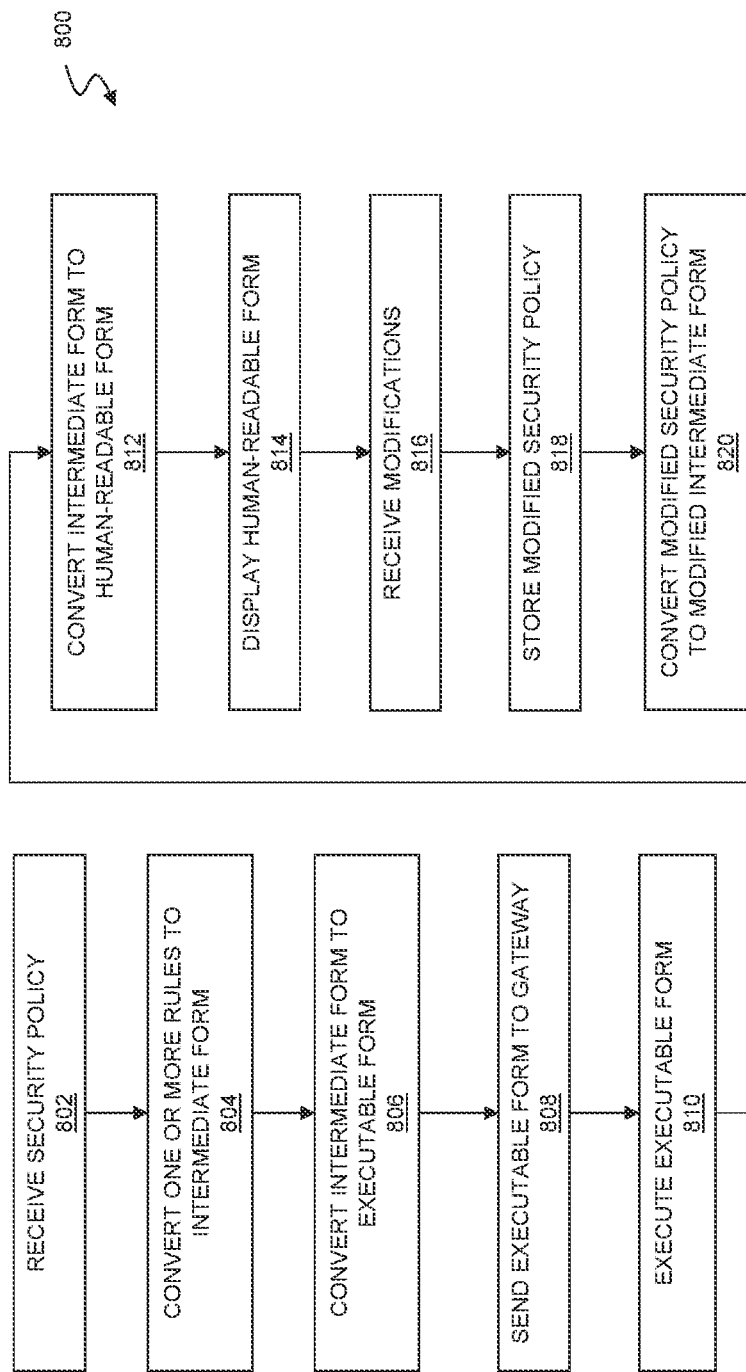
FIG. 8 shows a method for using intermediate representations of security policies.

FIG. 8 shows a method for using intermediate representations of security policies. In general, an administrator may specify a security policy at a user interface, and the security policy is then be applied at a gateway or other security appliance, network device, or the like. A security policy may refer to any configuration object specifying one or more conditions for allowing user access to a resource. In this context, the security policy may have a human-readable representation used within the user interface to support administrative interactions with elements of the security policy, as well as a machine-executable representation for use by the gateway in implementing the security policy. An intermediate form of the security policy may usefully provide a common representation that can conveniently converted for use in either/both of these contexts, thus supporting concurrent use of a security policy by machine and human actors, and generally preventing loss of fidelity in policy representation and evaluation.

As shown in step 802, the method 800 may include receiving a security policy from an administrator for an enterprise network, the security policy including one or more rules for use of the enterprise network. In general, this may include any rules or combination of rules controlling usage of resources within an enterprise network. For example, this may include network usage parameters such as bandwidth, priority, restrictions, prohibited addresses, and trusted addresses, resource usage parameters such as prohibited or permitted resources, credential or authentication requirements, and health status requirements, user parameters such as access control lists, user types, and so forth. More generally the security policy may include any rules for controlling, limiting, or authorizing usage by an endpoint and/or user of resources within an enterprise network and/or outside the enterprise network.

The security policy describing these restrictions and permissions may be represented as a configuration object that specifies conditions for access to and use of resources in an enterprise network. For example, a policy may specify that access to a network location is permitted if the endpoint requesting access has an adequate antivirus status. The configuration object may be represented in JSON, XML, CSV, YAML, or a similar file format, or any other format or data object suitable for storing corresponding usage rules. An administrator for a network may create or delete a security policy at a user interface on an administrator console, and may add, remove, or modify policies within an existing security policy. The administrator may also configure a time duration until which the policy is valid. A threat management facility or a similar network security resource may then receive a new security policy from the administrator for implementation on an enterprise network.

As shown in step 804, the method 800 may include converting the one or more rules into an intermediate form representing corresponding rules for any of the security policy parameters described above, or any similar usage restrictions, rules, and the like. The intermediate form may be used as a guide to render policy parameters within the user interface, and may also be compiled into Rego code to be sent to a gateway for deploying the security policy to the enterprise network. The intermediate policy may have its own grammar construct that may be parsed and used to generate appropriate representation for the user interface and for the gateway. The intermediate form may be stored in a database at a threat management facility or any other suitable local or remote data store that can be used by the threat management facility and the gateway for managing the security policy.

As shown in step 806, the method 800 may include converting the intermediate form into an executable form. The intermediate form may be parsed to generate an executable that is in a readable form for a gateway or other network appliance such as a firewall, network address translation device, router, or the like. In one aspect, executable form may be expressed in Rego, an open source query language for defining policies in an executable format for a gateway. While Rego is a query language that supports structured document models such as JSON in a manner suitable for implementing enterprise policies such as a security policy, other languages or combinations of languages and software environments may also or instead be used. If the executable form is created at, e.g., the threat management facility or some other resource remote from the gateway where the security policy is to be deployed, the executable form may be formatted as a compressed and/or zipped file such as a tar file that contains one or more files. The one or more files may include one or more policy definition files (e.g., rego files) for each resource that the gateway manages.

As shown in step 808, the method 800 may include sending the executable form to a network appliance such as a zero trust network access gateway for the enterprise network. The executable form may be sent to a gateway as a changelog documenting incremental changes or updates to prior security policies. Where no prior security policy is present, the changelog may completely restate the current security policy for the gateway. The gateway may have a cloud agent component configured to receive the executable form. Where an incremental changelog is used, other components of the security policy may be retained in the intermediate form to facilitate, e.g., subsequent display to an administrator or conversion to an executable form (or new changelog therefor) as the security policy is revised over time. While the threat management facility may send the executable form to the network appliance, in some embodiments the threat management facility may alternatively send the intermediate form to the network appliance. The network appliance may then convert the intermediate form to the executable form.

As shown in step 810, the method 800 may include executing the executable form on a gateway for an enterprise network to manage user access to network locations and resources. For example, the executable form may be executed on a zero trust network access gateway to manage user access to an application for the enterprise network. The gateway may have an Open Policy Agent (OPA) component responsible for policy evaluation. If the contents of the executable form are not considered sensitive data, the executable form may first be saved as an encoded string in a data store at the gateway. The encoded string may be base64 encoded string. If the contents are considered sensitive, the executable form may be saved in a Kubernetes secrets data store, or otherwise cryptographically secured against unauthorized access. The executable form may then be sent from the cloud agent component to the OPA and evaluated to manage user access to an application or resource. During evaluation, the OPA may distinguish between agentless policies and agent-based policies so that the policies can be appropriately matched to resources. That is, agentless policies may only be applied to an agent-less resource while agent-based policies may only be applied to an agent-based resource. Evaluating agentless policies may involve importing an Envoy module while evaluating agent-based policies may involve importing a WSS module. Evaluating agent-based policies may further involve receiving health status updates from endpoints and comparing them with the agent-based policies. It will also be understood that where the executable form is compressed, packed, or otherwise formatted for communication to the gateway, executing the executable form may include, as a precursor, unpacking, decompressing, and/or otherwise preparing the executable form for local use by the gateway.

As shown in step 812, the method 800 may include converting the intermediate form into a human-readable form of the one or more rules. After a gateway has evaluated the executable form, it may be advantageous to revert the executable back into a human-readable form for the administrator to review and edit. This permits the administrator to view and modify a proxy for the security policy in a format suitable for human interaction.

As shown in step 814, the method 800 may include displaying the human-readable form of the one or more rules on a user interface. The rules may be presented at an administrator console for an administrator to review and modify.

As shown in step 816, the method 800 may include receiving modifications to the security policy from the administrator. The user interface may support modifications to the security policy such as additions, deletions and modifications to individual policies or rules. The user interface may also support operations such as a search, copy, paste and the like, which may be particularly useful for large security policies with numerous individual rules. The interface may also support error checking, validation, security assessments (e.g., concerning the relative riskiness of a security configuration), and so forth. For example, before deletion, the administrator console may check whether the policy has been assigned to one or more resources. If the policy has, then deletion may not be allowed. Otherwise, the policy may be deleted.

As shown in step 818, the method 800 may include storing a modified security policy including the one or more rules and the modification. The modified security policy, as edited by the administrator, may be stored in the intermediate form.

As shown in step 820, the method 800 may include converting the modified security policy into a modified intermediate form. After being stored in the intermediate form, the security policy may be converted into the human-readable form (for the administrator console) or the machine executable form (for the gateway) as needed.

FIG. 9 illustrates a policy file. A policy file may be composed of one or more rules specifying conditions for granting access to an entity for one or more applications. Each of the one or more rules may include an assignment of the policy to one or more resources, including applications, networks, servers, remote devices, and the like. The policy file may be written in the Rego language or any other suitable policy language or the like. Allow blocks may specify conditions in which an entity may be granted access. By default, the allow value may be set to false.

FIG. 10 illustrates a parser grammar set for a security policy. A parser may be used to convert an intermediate form of a security policy into an executable form. In some embodiments, the parser may be built using the Apache Freemarker Template Engine, an open source java library capable of generating text outputs based on templates. The parser may have a grammar construct to handle different types of access rules. The grammar construct may include three parts: a rule type, a rule condition, and a rule value. The rule type specifies the main category of the rule, the rule condition specifies the matching criteria to be used for the rule, and the rule value specifies the actual values that will be used to apply the rule condition.

FIG. 11 illustrates a user interface for configuring security policies. The administrator may access the user interface through an administrator console hosted at a threat management facility. The user interface may have a page displaying a list of policies for an enterprise network. The page may display one or more properties of each policy in the list such as status, number of resources, and date of last modification. The user interface may allow the administrator to select one or more operations on a policy, such as adding a policy, deleting a policy, and editing a policy. If the administrator selects adding a policy, the administrator may first configure the policy as an agent-based or agentless policy. The policy may then be saved on a database on the threat management facility and assigned to one or more resources. If the administrator selects deleting a policy, the threat management facility may determine whether the policy has been assigned to a resource. If so, the user interface may display an error and disallow the deletion. Otherwise, the policy may be deleted from the database. The database may store each policy as a table with a set of associated attributes, which may include one or more of policy ID, name, enforcement status, account ID, validity timestamp, creation timestamp, last update timestamp, and policy type.

According to the foregoing, there is also disclosed herein a method for storing and managing a security policy for an enterprise network. The method may include the steps of receiving a security policy from an administrator, the security policy including one or more rules; converting the one or more rules into an intermediate form; converting the intermediate form into an executable form; sending the executable form to a gateway; and executing the executable form on the gateway to manage user access to an application.

According to the foregoing, there is also disclosed herein a system for storing and managing a security policy for an enterprise network. The system may include an endpoint in a zero trust network access environment; a zero trust network access gateway; a database; and a threat management facility for an enterprise network, the threat management facility hosted on a cloud computing platform. The threat management facility may include a processor and memory storing computer executable instructions that configure the threat management facility to perform the steps of: receiving a security policy from an administrator console, the security policy including one or more rules; converting the one or more rules into an intermediate form; storing the intermediate form on the database; converting the intermediate form into an executable form; sending the executable form from the database to the gateway; and executing the executable form on the gateway to manage user access to an application.

Figure 12:
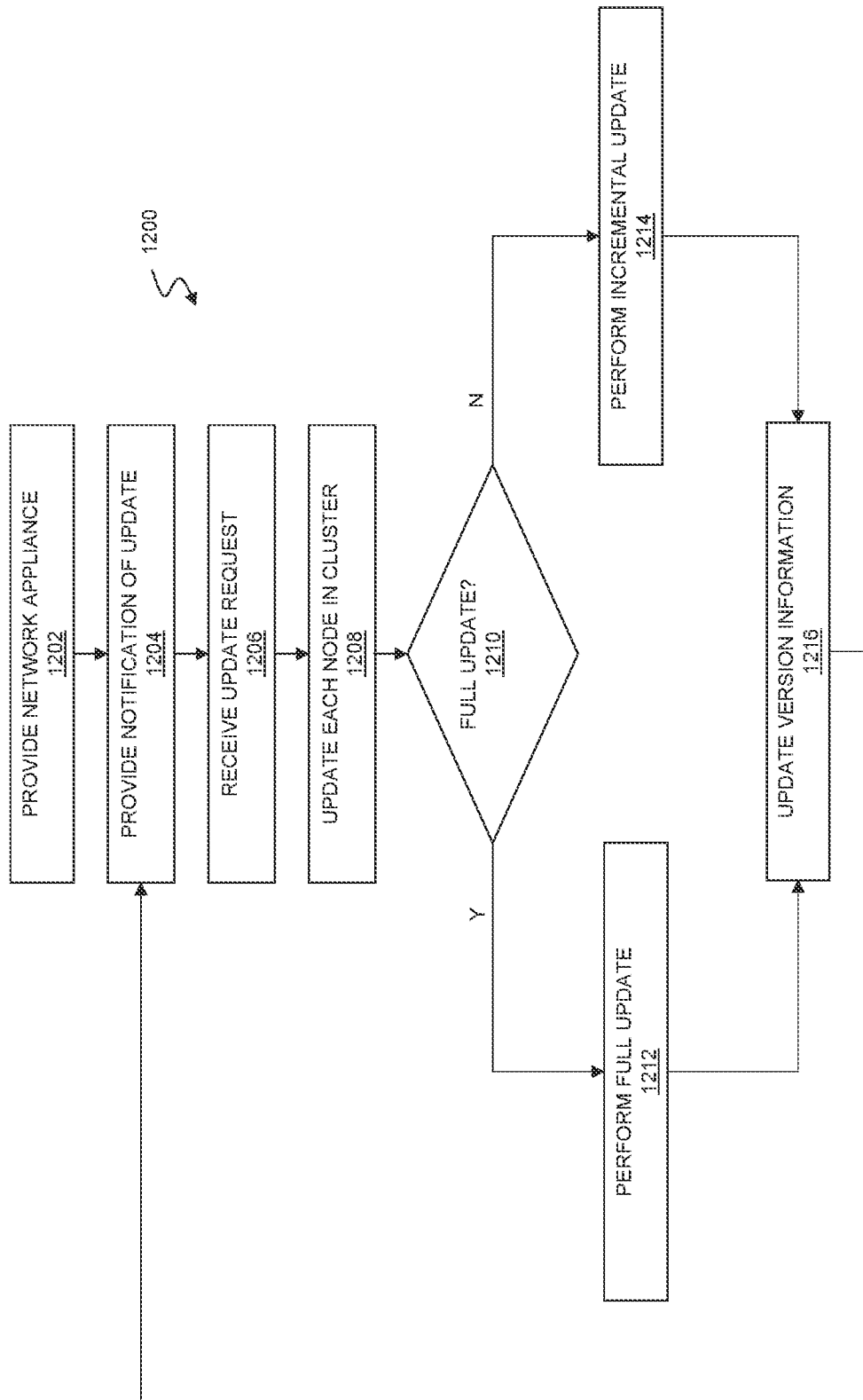
FIG. 12 illustrates a method for automatically updating a cluster of network devices.

FIG. 12 illustrates a method for automatically updating a cluster of network devices. In general, an administrator can initiate an automatic software update to a network appliance that is configured as a cluster of nodes. The update may be performed sequentially on a node-by-node basis in order to maintain availability and performance of the network appliance during the update.

As shown in step 1202, the method 1200 may include providing a network appliance configured in a cluster of nodes, each node of the network appliance similarly configured to support network functions and each node of the network appliance including a bootable partition executing an update agent and an update partition configured to store a different version of the node. This may, for example, include an enterprise network gateway, a zero trust network access application gateway for the enterprise network, a firewall for the enterprise network, or any other network appliance, network device, or the like, that might be operated in a cluster to support redundancy, error tolerance, high availability, scalability, and so forth. For example, this may include a cluster of gateways coupled to a network through a load balancing device or the like for scalable management of access to resources such as ZTNA applications for the enterprise network. In general, the network appliances may be hardware appliances, virtual appliances, or some combination of these.

As shown in step 1204, the method 1200 may include providing a notification to a network administrator of an update available for the network appliance from a user interface of a threat management facility for an enterprise network, the notification including an indication of whether the update is a full update to each node or an incremental update to each node. The notification may be provided to the network administrator, for example, through an administrative console of a threat management facility, or as an electronic mail, text message, or other notification for the network administrator. This may include an update provided from a third party vendor, such as an operating system update, or an update to an application, driver, security agent, process, library, database, definition files, registry settings, or other computer object or combination of computer objects controlling operation of the network appliance. This may also or instead include configuration updates or other software changes or the like from an administrator or IT professional for the enterprise.

As shown in step 1206, the method 1200 may include receiving an update request from the network administrator to perform the update to the cluster of nodes. In the administrative console, the network administrator may review available updates, and, after assessing the need for the update, the network administrator may request an update through the interface for the network appliances. The administrator console may give the network administrator an option to choose a schedule for the update, which may be immediate or scheduled at a later period. The threat management facility may create a changelog entry to store the schedule in a database. It will be understood that an entire enterprise estate may include a number of different clusters, which may be, e.g., geographically or functionally distributed for the enterprise. The administrator may select a particular cluster for an update in the console. In another aspect, the administrator may choose to update an entire estate, which may be performed in parallel for each independent cluster, or in sequence, e.g., sequentially from cluster to cluster and then sequentially from node to node within each cluster, with the order of update being selected manually by the administrator, automatically by the threat management facility, or some combination of these.

As shown in step 1208, the method 1200 may include automatically and sequentially updating each node in the cluster from the threat management facility according to the update while continuing to operate each other node in the cluster that is not being updated. In this manner, the cluster may generally remain available throughout the update while individual network appliances are updated in order according to the update(s). In general, the threat management facility may send an update notification to each node being updated. The update notification may include the update type and the update schedule. An update agent at each node may be responsible for upgrading the node according to the update notification and reporting an update status to the threat management facility. Alternatively, the update agent may be one or more independent processes at the threat management facility that communicate with some other resource(s) on each target node. The update agent may invoke a Linux cron job based on the update schedule to trigger the update, or use any other shell script, bash command, or other scheduling device to sequence updates on and among the nodes being updated. The update agent may select a download link (i.e., a URL) for the update according to the update notification or some other preexisting protocol or the like (e.g., based on the update type). The update may then be downloaded from the URL.

As shown in step 1210, the method 1200 may include determining whether the update is a full update or an incremental update. In general, updates may include updates to individual components for the network appliance, such as a network driver, a security application, a communications process, a console, or the like. For example, the network appliance may include individual software components for network proxy, authentication, authorization, agent traffic, data plane, control plane, and so forth, any of which may be updated as an independent software component without requiring a restart of the network appliance (although some functions controlled by such a component may be paused or terminated temporarily). In another aspect, the update may be a complete update to or replacement of the software stack for the network appliance including, e.g., the operating system and related components such as the kernel, drivers, registry, and the like. The nature of the update will affect whether each network appliance to be updated will need to be taken offline, updated with a new image, and then restarted, or whether alternatively, new software may be installed (or other data updated) while the network appliance is live. In general, a full update that requires a new bootable image to be loaded and then restarted will be more time consuming and will impose greater performance constraints on the system. As such the administrator may view the type of update in the console and select a specific plan for the timing and/or sequence of updates.

As shown in step 1212, the method 1200 may include, when the update is a full update, copying the update to an update partition and rebooting the node from the update partition. In order to support management of partial and full updates, each network appliance may include two partitions or other logically separated storage sections on a hard disk, virtual hard disk, or other storage device for the network appliance. The first partition may serve as a current partition from which the network appliance is currently executing. The second partition may serve as an update partition where a new image can be loaded when a full update is required. During a full update, the new image for the network appliance may be downloaded to the update partition, and may also be verified by the network appliance. The device may then be booted from the update partition (which, if the boot is successful, becomes the current partition). The current partition then becomes the update partition. Until the next full update, this partition can also function as a rollback partition, permitting the device to be rolled back to the last full update, e.g., in the event that the latest update cannot start/launch successfully. The update partition may store the rollback partition before the full update occurs. The device may be rolled back by reverting to the rollback partition on the update partition.

As shown in step 1214, the method 1200 may include when the update is the incremental update, updating one or more software components on a system image executing from the bootable partition of the node. This latter update does not require the use of the update partition. Rather, individual software components can be installed, uninstalled, modified, or updated using any installer, program manager, or other program or agent suitable for the managing applications on the software platform of the network appliance. For example, a container orchestration platform such as Kubernetes or K3s (a lightweight implementation of Kubernetes) may be used to manage and update the individual software components. The program manager (or other agent or the like) may also be used if/when necessary to roll back any incremental software update installed in this manner.

As shown in step 1216, the method 1200 may include, upon a completion of the update on each node in the cluster, updating version information for the network appliance at the threat management facility. The update agents of the nodes may monitor and manage the nodes throughout the update process. This may for example include one or more of maintaining active or alternative partitions, deleting active cron jobs, error handling, detection of completion, confirmation of successful update, and cleaning up stale images. When an update is successfully completed, the threat management facility may receive a corresponding update status for each node from the update agents and update an entry for the updated cluster in a database. This permits the network administrator to monitor update progress, view the current version and version history, and to know when a next update is available for nodes in the cluster.

The method may then return to step 1204 when a notification for a new update is available.

According to the foregoing, there is also disclosed herein a method for updating a network appliance for an enterprise network. The method may include the steps of receiving an update request from a network administrator to perform the update to a network appliance including a cluster of nodes, each node including a bootable partition executing an instance of the network appliance including an update agent and each node including an update partition configured to store a different version of the network appliance; automatically and sequentially updating each node in the cluster from a remote resource according to the update while continuing to operate each other node in the cluster that is not being updated; and upon a completion of the update on each node in the cluster, updating version information for the network appliance at a threat management facility. Updating each node may include operating the update agent for the node to perform the steps of updating one or more software components on a system image executing from the bootable partition of the node when the update is an incremental update, and copying the update to the update partition and rebooting the node from the update partition when the update is a full update.

According to the foregoing, there is also disclosed herein a system including a network appliance for an enterprise network, a data store, a threat management facility, and an update agent. The network appliance may be configured in a cluster of nodes each similarly configured to support network functions and each including a bootable partition providing functions of the network appliance and an update partition configured to store a different version of the node. The data store may store an updated version of the network appliance, which may be received from a vendor or other source of data updates. The threat management facility may be configured by computer executable code stored in a non-transitory computer readable medium to provide a user interface for receiving an update request from a network administrator to perform an update to the cluster of nodes based on the updated version of the network appliance. The threat management facility may be further configured to respond to the update request by automatically and sequentially updating each node in the cluster according to the update while permitting continued operation of each other node in the cluster that is not being updated. The update agent may execute on each node in the cluster, and may be configured by computer executable code stored in a memory to be responsive to the threat management facility to install the update according to the updated version of the network appliance by performing the steps of: when the update is an incremental update, updating one or more software components on a system image executing from the bootable partition of the node, and when the update is a full update, copying the update to the update partition and rebooting the node from the update partition.

Figure 13:
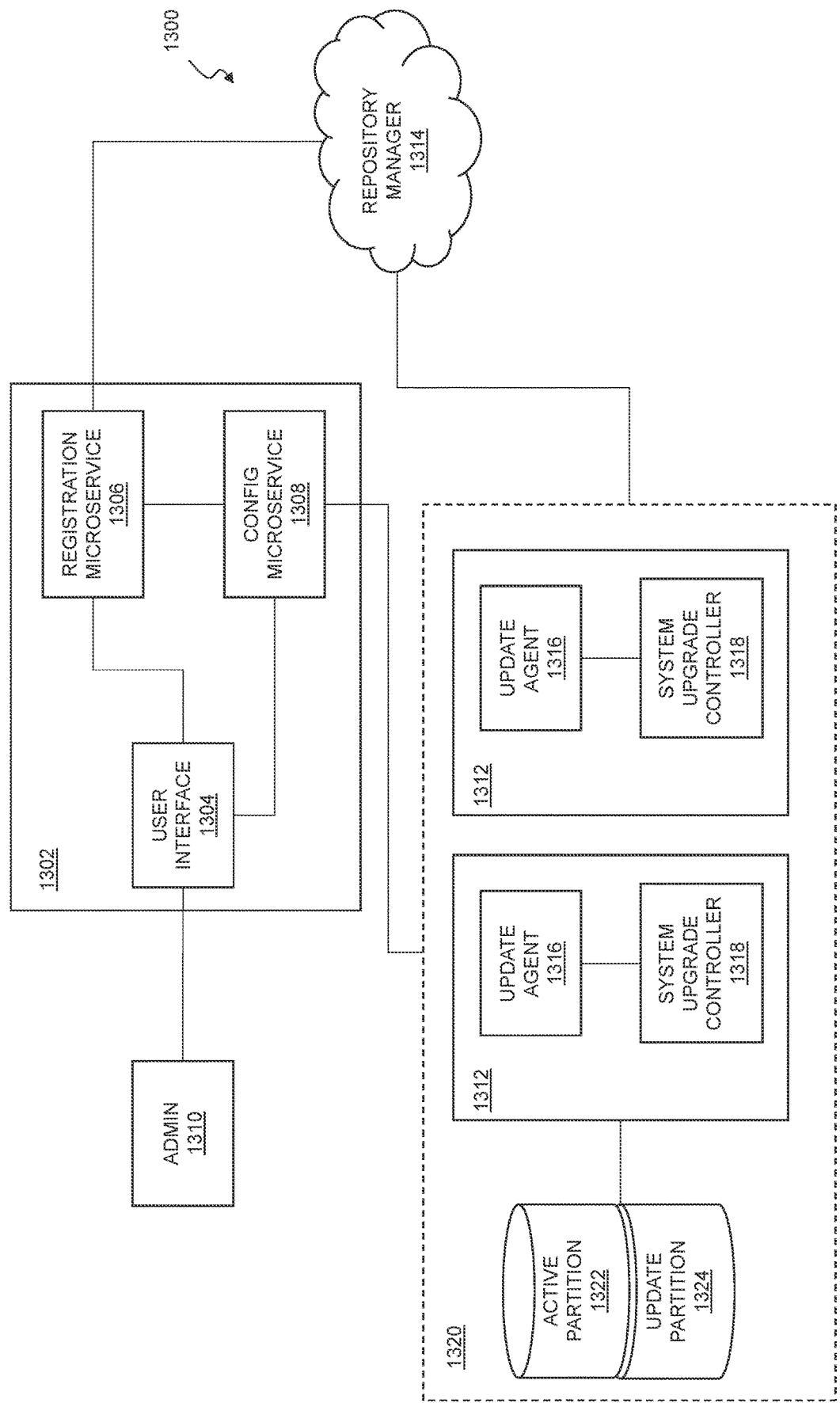
FIG. 13 shows a system for updating network appliances.

FIG. 13 shows a system 1300 for updating network appliances. The system 1300 may include a threat management facility 1302 such as a central threat management facility or any of the other threat management facilities described herein. The threat management facility 1302 may be hosted on an enterprise network, and/or remotely as a cloud-based security resource. The threat management facility 1302 may be part of a threat management system for protecting a network against a plurality of security threats, such as the system 101 shown in FIG. 1.

The threat management facility 1302 may include a user interface 1304, a registration microservice component 1306, and a config microservice component 1308. An administrator 1310 may access the threat management facility 1302 through a user interface 1304 to initiate an update request for a network appliance 1312 connected to the threat management facility 1302. The user interface 1304 may display attributes of the network appliance 1312 received from the config microservice component 1308. The attributes may include one or more of the current software version, previous software version, available updates, update type (e.g., full or incremental), update event (e.g., upgrade, rollback, or cancel), update status (e.g., success, failure, updating, schedule, or canceled), and update schedule. The administrator 1310 may specify the upgrade type and the upgrade schedule for the network appliance 1312 in the update request if an update is available. Once the update has completed or failed, the user interface 1304 may display the corresponding update status.

The registration microservice component 1306 may be responsible for maintaining and relaying information on available updates. The registration microservice component 1306 may periodically download release manifests from an external repository manager 1314 such as JFrog cloud Artifactory or any other code management platform or system. The registration microservice component 1306 may receive a request from the config microservice component 1308 to check for available updates for the network appliance 1312. The registration microservice component 1306 may parse through one or more release manifests to check for available updates. The registration microservice component 1306 may then return a Boolean value to the config microservice component 1308 based on whether an update is available.

The config microservice component 1308 may be a registry responsible for storing the attributes of the network appliance 1312 at the threat management facility 1302. The config microservice component 1308 may use PostgreSQL as its persistence store. The config microservice component 1308 may communicate with other components of the threat management facility 1302 (e.g., the user interface 1304 and the registration microservice component 1306) and the network appliance 1312 to send and receive updated values for the attributes. For example, once the administrator 1310 has chosen an upgrade schedule, the user interface 1304 may send the upgrade schedule to the config microservice component 1308, which may then store the upgrade schedule. The config microservice component 1308 may also receive an upgrade status from the network appliance 1312 and store an upgrade status of the upgrade once the upgrade has completed or failed.

The network appliance 1312 may include a ZTNA gateway or any other network device, or the like, that may perform network functions. The network appliance 1312 may be configured as a cluster of nodes, each node of the cluster similarly configured to support network functions. The network appliance 1312 may include one or more update agents 1316 and a system upgrade controller 1318. In some embodiments, each node of the network appliance 1312 may have an update agent 1316. After the administrator 1310 has selected the update type and the update schedule for the update request, the config microservice component 1308 may send the update type and the update schedule as an update notification to the update agent 1316. Based on the update notification, the update agent 1316 may download a corresponding artifact from the external repository manager 1314.

As aforementioned, the upgrade type may be an incremental update or a full update. For an incremental update, the update agent 1316 may execute the update through a program manager or installer, such as Kubernetes. For a full update, the system upgrade controller 1318 at the network appliance 1312 may handle the update by copying the update to an update partition and rebooting the network appliance 1312. Once execution of the update has completed, the update agent 1316 may send an update status back to the config microservice component 1308. The config microservice component 1308 may then update a corresponding entry for the network appliance 1312. In general, each instance of the network appliance 1312 in a cluster 1320 may execute from an active partition 1322, while storing a previous full update, or a new pending full update, in the update partition 1324 to facilitate transitions between versions.

FIG. 14 illustrates a user interface for updating network appliances. The user interface may display one or more network appliances, each as a cluster of nodes. For each cluster, the user interface may display one or more attributes of the cluster, such as name, status, Fully Qualified Domain Name (FQDN), type, current version number, network appliance number, and number of active users. The user interface may provide an administrator with an alert when an update is available for a particular cluster. The administrator may then initiate an update of the cluster within the user interface, in response to which the user interface may prompt the administrator to choose an update type and update schedule. The user interface may display the progress of the update, such as by displaying a timer icon indicating a time until an update will be initiated or a predicted time of completion (or both). While the update is in progress, the administrator may have the option to cancel the update and roll back or reverse any changes. The user interface may alert the administrator with an update status once the update has successfully completed or failed.

Figure 15:
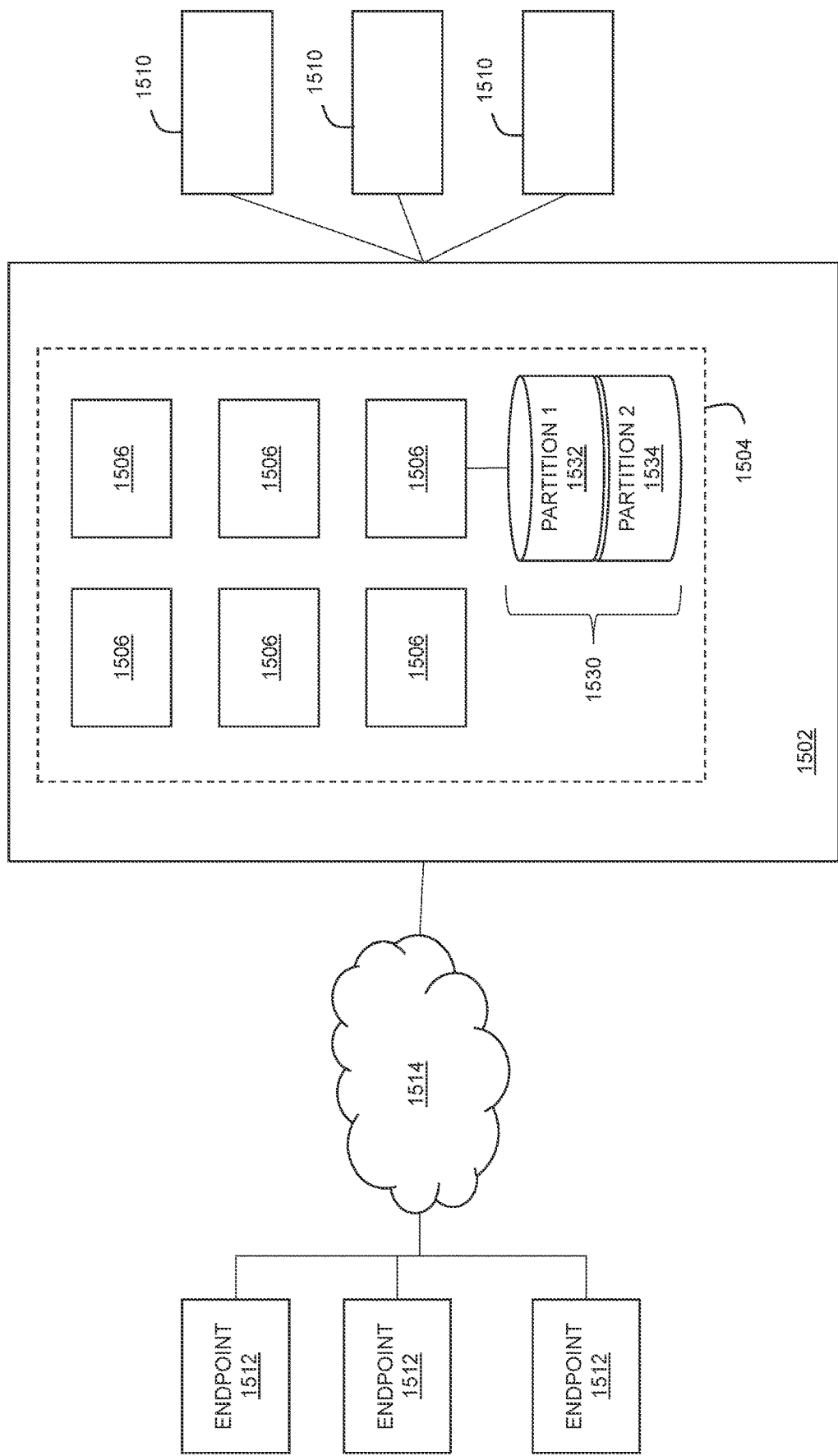
FIG. 15 shows a cluster of compute instances.

FIG. 15 shows a cluster of compute instances. In general, a network device 1502 such as a gateway may be deployed as a cluster 1504 of compute instances 1506 such as virtual computing devices executing in a virtualization environment in order to support high availability and scalability, or any of the other clusters described herein.

The cluster 1504 may function as a gateway for a zero trust network access resources, a gateway for an enterprise network or more generally, as a network device for managing access to one or more other network resources. The network device 1502 may, for example, be any corresponding device such as a gateway for an enterprise network and/or a gateway for one or more zero trust network access resources of an enterprise or other entity. In this capacity, the network device 1502 may manage access to one or more resources 1510 such as cloud services, software-as-a-service applications, data storage, zero trust network access applications, and so forth, by one or more endpoints 1512 coupled to the network device 1502 through a data network 1514. In general, the endpoints 1512 may be any of the endpoints 1512 described herein, and the network device 1502 may be any of the network devices described herein. The resources 1510 may in general be multiple instances of the same resource, different resources, or some combination of these.

The cluster 1504 may be managed, e.g., remotely through a console or the like, using a container orchestration platform such as Kubernetes or K3s, or any other operating system or environment suitable for managing an elastic framework of individual web servers or other resources in a scalable deployment. In a container orchestration platform, each managed device may include a container orchestration service that acts as an agent for coupling the compute instances 1506 together to operate as, e.g., a gateway or other network device 1502, web service, or the like. The cluster 1504 may also use a consensus protocol in order to synchronize devices within the cluster 1504 so that they are all similarly configured to operate consistently or identically with one another. A variety of consensus protocols are known in the art and suitable for maintaining consistency among compute instances 1506 in the cluster 1504. By way of non-limiting example, the Raft consensus protocol can be used to maintain synchronization among nodes in a cluster by electing a leader or "primary instance" that replicates a log outward to conform other nodes to the leader's configuration.

Each compute instance 1506 may include a memory 1530 divided by an operating system or other software and/or hardware into one or more partitions such as a first partition 1532 and a second partition 1534 providing logically distinct memory spaces that can be accessed, e.g., as separate disk drives. This permits an older version of software for the compute instance 1506 to be stored on an inactive partition or rollback partition while the compute instance 1506 executes from another partition, referred to herein as the current partition or active partition, typically including bootable media (or an associated boot partition) from which the compute instance 1506 boots on a restart. Restoring a prior software version may include restarting the compute instance by booting from the rollback partition, at which point the other partition becomes the inactive partition. In this manner, the compute instance 1506 can toggle between a current partition and a rollback partition in order to change versions of software.

While this general architecture provides good capacity and scalability that can be deployed on a wide range of cloud computing platforms or the like, it presents challenges in the context of a software rollback for a cluster of devices, particularly a software rollback that requires a reboot to return to a previous software installation. In particular, the reboot will cause a loss of the current consensus state, and may cause significant delays in restarting the cluster because the cluster must renegotiate a new consensus state, or worse, may revert to an undesirable previous consensus state. In such a cluster of network devices using a consensus protocol for cluster synchronization, a full software rollback may advantageously be performed by backing up a cluster state on a rollback partition of a primary instance for the cluster that stores a prior software version for the primary instance. All of the compute instances in the cluster can then be restarted from the same rolled back software version, and the primary instance can start a cluster management service such as the cluster orchestration service and propagate the stored consensus state as other devices join the cluster.

Figure 16:
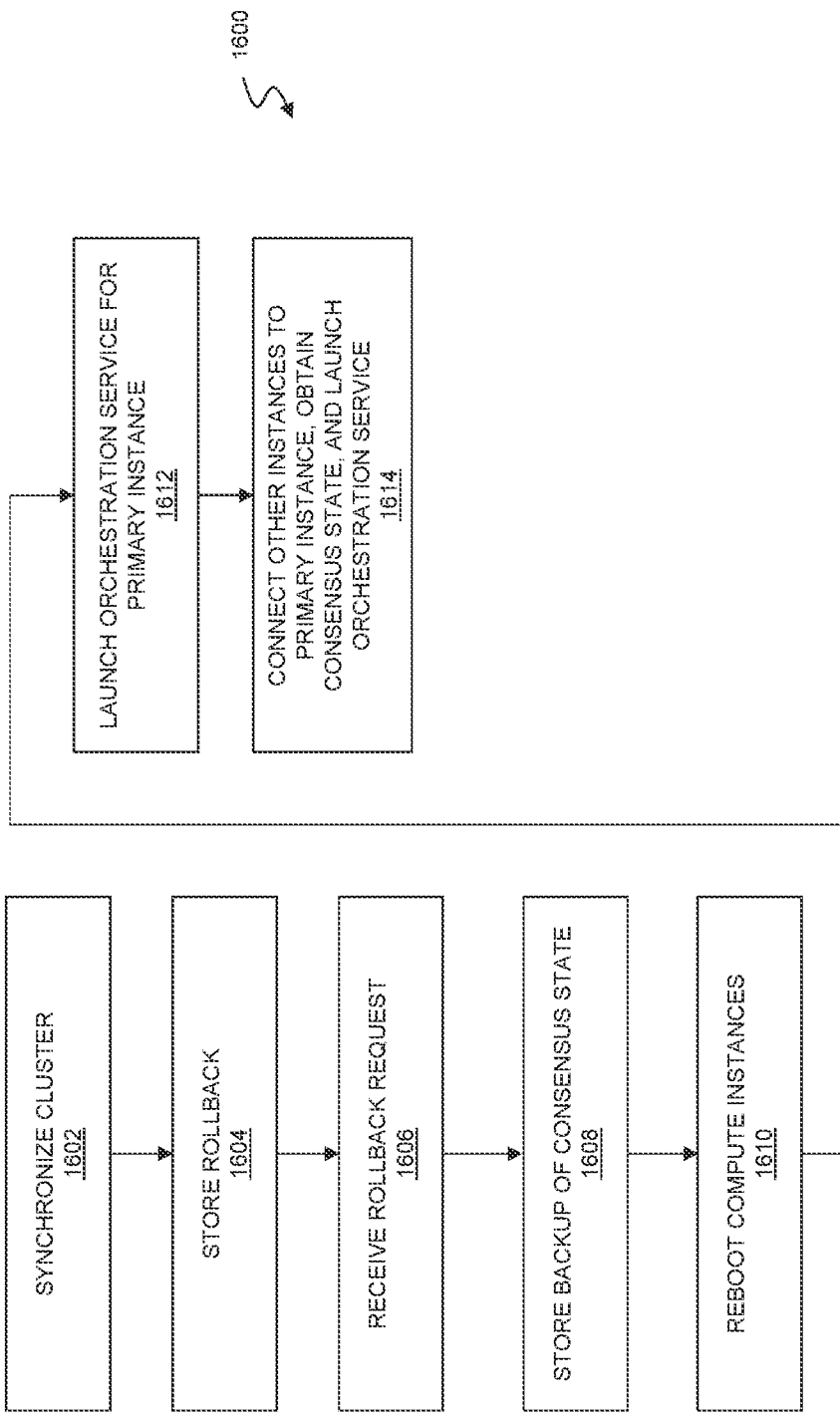
FIG. 16 shows a method for rolling back software in a cluster of compute instances.

FIG. 16 shows a method for rolling back software in a cluster of compute instances. In general, this may be a cluster of compute instances manage (e.g., remotely) with a cluster orchestration platform and synchronized using a consensus protocol as generally described herein.

As shown in step 1602, the method 1600 may include synchronizing a plurality of compute instances in a cluster using a consensus protocol. This may include the use of any of the clusters and consensus protocols described herein. As noted above, the cluster may be managed using any suitable cluster orchestration platform or the like, which may be deployed on each compute instance, e.g., as a service, a process, an agent, or the like. In the Raft consensus protocol, synchronization generally includes the selection of a leader or primary instance using a technique defined in the protocol, and then propagating a log containing the consensus state of machines in the cluster from the primary instance to other compute instances in the cluster, or otherwise replicates the log outward to synchronize other compute instances. However, any protocol may be used that results in a consensus state that is supervised by one of the nodes in the cluster.

In general, the cluster may perform any function(s) that might usefully be performed in a scalable manner in a data network. For example, the cluster may support a web server, a data center, a zero trust network access gateway, or any other network resource or the like. In one aspect, the plurality of compute instances operates as a gateway for an enterprise network. In another aspect, the plurality of compute instances operates as a gateway for a zero trust network access to one or more online resources. In another aspect, the plurality of compute instances functions as a network device managing access to one or more network resources.

As shown in step 1604, the method 1600 may include storing a prior software version in a rollback partition on each of the compute instances, including a primary instance for the consensus protocol. For example, a rollback instance stored in the rollback partition may include a previous version of software for the primary instance, and/or a previous version of software for a server in the cluster. The rollback partition may generally be any separate section of a physical or logical storage device that is treated by an operating system as a separate logical volume. Using this partition, a separate, prior, bootable version of one of the compute instances may be stored for subsequent recovery. In order to return to the prior version, the compute instance will generally restart and boot from the rollback partition, which then changes to a current or active partition for the compute instance, with partition that was previously active becoming the rollback partition.

As shown in step 1606, the method 1600 may include receiving a rollback request in the cluster. This may, for example, include receiving a rollback request on the primary instance of the cluster, and more generally receiving the rollback request at each compute instance in the cluster, e.g., at the container orchestration service executing on each compute instance, or any other agent, service, or the like suitable for receiving remote instructions. The request may be issued from an administrative console or the like for the cluster, or from any other human or programmatic source. The rollback request may more specifically request a rollback to a prior software version for compute instances in a cluster, e.g., where multiple rollback partitions and previous software versions are stored on each compute instance. In general, a rollback may be requested under a variety of circumstances, such as when an update fails, or when an update is slow or buggy, or when other software of interest is only compatible with prior software versions. Regardless of the reasons, the rollback may be requested through the container orchestration platform or other cluster management platform and received at a corresponding agent on each compute instance within the cluster.

As shown in step 1608, the method 1600 may include, in response to receiving the rollback request, storing a backup of the consensus state. In one embodiment, storing the backup may occur at the start of an update request before the cluster is updated. The backup may advantageously be stored by the primary instance for the consensus protocol, which should already contain the current consensus state being propagated to other compute instances in the cluster. The backup may, for example, include a key-value store file such as an etcd file for a k3s cluster, or any other suitable backup file, configuration file, or other file format or the like. The backup of the consensus state may be stored, e.g., in the rollback partition of the primary instance so that it is available to the current operating system after a reboot from the rollback partition. In another aspect, the backup may be stored at some other location, such as a third partition on the primary instance, or at some remote data repository accessible to the primary instance after network services have been started.

As shown in step 1610, the method 1600 may include restarting each of the plurality of compute instances (including the primary instance) and then rebooting each of the plurality of compute instances from the rollback partition. During the reboot process, the container orchestration service may be halted on the rollback partition of each compute instance. The plurality of compute instances may then be rebooted at the same time.

As shown in step 1612, the method 1600 may include launching a container orchestration service (or other platform orchestration agent, service, or the like) on the primary instance for the consensus protocol. After starting the container orchestration service, the primary instance will become available to other compute instances within the cluster at a virtual address such as a virtual IP address within the cluster address space.

As shown in step 1614, the method 1600 may include connecting each one of the other plurality of compute instances to the primary instance and, in response to connecting to the primary instance, obtaining the consensus state from the primary instance, and launching the container orchestration service. In general, a cluster orchestration service should not be running on other compute instances during the restore. Instead, the other compute instances will check for connectivity to the primary instance using the virtual address assigned to the primary instance after it has started the container orchestration service. Each of the compute instances can then connect to the primary instance and obtain the consensus state stored by the primary instance before the restart. From the perspective of the primary instance, this step may generally include receiving connections from other compute instances in the cluster at a virtual address for the cluster, and then transmitting the consensus state to one or more other compute instances in the cluster. Each of the compute instances is then restored to the prior software version from its own rollback partition and synchronized with the consensus state provided by the primary instance.

According to the foregoing, there is also disclosed herein a primary instance in a cluster of nodes synchronized using a consensus protocol, the primary instance configured by computer executable code stored in a memory that, when executing on the primary instance, perform the steps of receiving a rollback request on a primary instance of a cluster that is synchronized with a consensus protocol; storing a backup of a consensus state for the cluster on the primary instance; rebooting the primary instance from a rollback partition; and launching a container orchestration service for the cluster on the primary instance.

Figure 17:
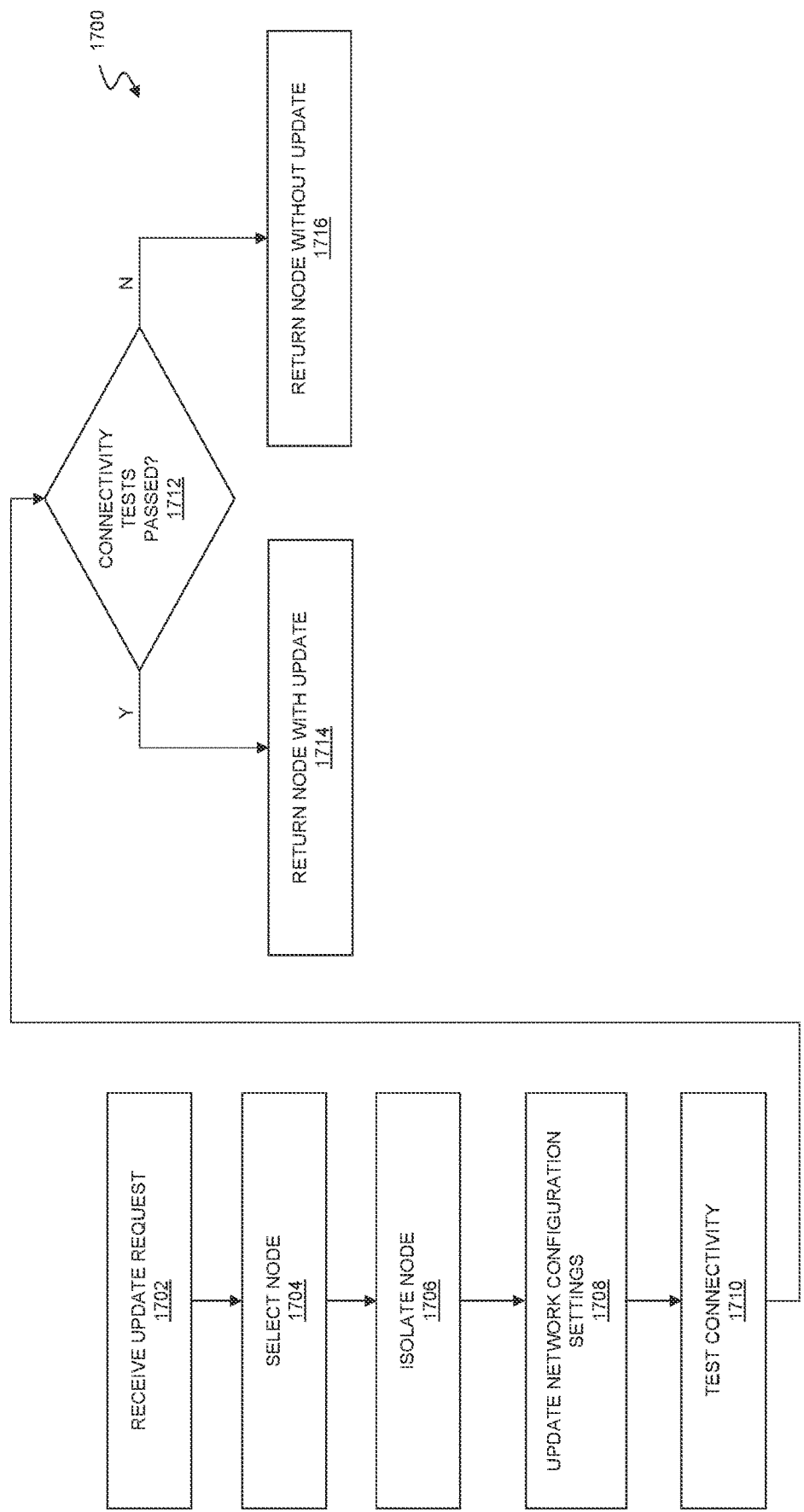
FIG. 17 shows a method for updating the network configuration for a cluster of nodes operating as a network appliance such as a gateway for zero trust network access (ZTNA) resources.

FIG. 17 shows a method for updating the network configuration for a cluster of nodes operating as a network appliance such as a gateway for zero trust network access resources. In general, a zero trust network access gateway, such as any of the gateways described herein, may be deployed as a data plane virtual appliance that handles all traffic to one or more protected resources. The gateway may be more generally deployed as a high-availability cluster of redundant compute instances with multiple nodes for fault tolerance. The cluster may be formed when an administrator sets up the gateway with multiple nodes and deploys the cluster using the administrator's configured network settings for each node's interface.

From time to time, an administrator may wish to change network settings for the nodes. The network configuration settings for a node may include any network parameters, settings or the like including, e.g., address configuration methods (e.g., DHCP, static, manual, etc.), network interface address(es), subnet mask(s), gateway address(es), packet sizes, domain name servers, and so forth. More generally, this may include any data used to configure the network interfaces of the node or the manner in which the node connects to and uses other network resources.

To facilitate remote administration, the gateway may be provisioned as a headless device, with all configuration changes controlled remotely from a cloud-managed control plane. However, such a cluster deployment assumes that the network settings remain constant through the life of each node in the cluster, so any change to network parameters requires manual intervention, and potentially downtime for the entire cluster (and therefore, the gateway). To address this problem, an administrator may advantageously update the network parameters of each node in the cluster sequentially by isolating one or more nodes. The rest of the cluster may continue to operate while the isolated nodes are updated.

As shown in step 1702, the method 1700 may include receiving a request to update network configuration settings for a plurality of nodes in a cluster. An administrator may input a request to update the network configuration settings for the plurality of nodes at the control plane. The control plane may be part of a threat management system such as the system 101 shown in FIG. 5, or any other system suitable for managing network appliances. The control plane of a master node in the cluster may coordinate the plurality of nodes in the cluster during the update. The control plane may provide the administrator with two different modes for applying network configuration settings: a normal mode and a force-apply mode. In the normal mode, network configuration settings are stored, and then applied when suitable conditions are present within the cluster such as favorable cluster load and cluster stability, along with good network connectivity. In a force-apply mode, the network configuration settings are applied to the nodes in the cluster without regard to cluster status, either immediately or at some predetermined time, but in either case, without regard to connectivity, stability, and load.

As shown in step 1704, the method 1700 may include selecting one or more of the plurality of nodes for an incremental update. Node selection for such a change may be based on any number of parameters, such as cluster load, fault tolerance (e.g., how many nodes can be removed at one time without negatively impacting availability), resource utilization, number of services hosted a particular node, number of requests to and from the gateway, and so forth. A particular node may be selected when the data traffic through that node can be managed by the remaining active nodes in the cluster and the removal of the selected node would not negatively impact cluster stability. If these conditions cannot be met, the administrator may be notified and an update to the network configuration settings may be deferred until more suitable conditions are present. If the update to network configuration settings is applicable for all nodes in the cluster, then this can be repeated for all nodes in the sequence. It will be understood that, while a single node update is illustrated, the method 1700 may include updating two or more nodes concurrently, e.g., where the remaining nodes in the cluster can support current traffic without interruption or significant decays in performance.

As shown in step 1706, the method 1700 may include isolating a node from the cluster while continuing to operate the cluster with the remaining plurality of nodes. Each of the plurality of nodes may be sequentially isolated from the cluster. Once a node is selected for an update to network configuration settings, the node may be taken out of the cluster or otherwise isolated from cluster functions and placed into a maintenance mode. For example, services such as keepalive, that might otherwise maintain a connection to other devices and keep communication pathways open, may be stopped for some period of time to prevent the node from participating in, or attempting to participate in, the cluster. Similarly, data plane services may be diverted to remaining active members of the cluster temporarily. For example, if the master node is isolated, another node in the cluster may become the master node and coordinate the cluster.

As shown in step 1708, the method 1700 may include updating the network configuration settings with an update for the node. Once a node has been isolated, the network configuration settings for the node may be updated.

As shown in step 1710, the method 1700 may include testing a connectivity of the node with the update. Testing the connectivity may include a connectivity check to the resources configured locally on the gateway, resources on the cloud and any specific resource endpoint that an administrator has provided for connection testing. In some embodiments, connectivity testing may include autonomously connectivity testing by the node, the results of which may be reported, e.g., after a successful update, or after a rollback in the event that the updated node cannot reconnect to the cluster or a connectivity supervisor.

As shown in step 1712, the method 1700 may include determining whether the connectivity passes one or more tests. The one or more tests may include one or more of a ping test, a traceroute test, a DNS query test, and/or any other suitable test for testing the connectivity of the node. The control plane may provide the administrator with an option to choose which tests to include in the connectivity test. In this manner, the administrator may adjust the thoroughness of the connectivity test.

As shown in step 1714, the method 1700 may include returning the node to the cluster with the update if the connectivity passes the one or more tests. If the new network settings do not result in a connectivity failure or any corresponding timeout in communications from the node during the one or more tests, the changes may be permanently applied and the node may rejoin the cluster with the new network configuration settings. Each node in the cluster may be transitioned to the new network configuration settings in this manner.

As shown in step 1716, the method 1700 may include returning the node to the cluster without the update if the connectivity does not pass the one or more tests. If the new network settings result in a connectivity failure or any corresponding timeout in communications from the node during the one or more tests, the node may permanently discard the changes and return a failed changelog to the administrator.

As a significant advantage, this method 700 may be performed without manual intervention during the update to the network configuration settings. It may, for example, be deployed in a fully automated manner by a gateway service on receipt of a changelog (e.g., from an administrator) on the cloud control plane.

According to the foregoing, there is also described herein a system including a network appliance (such as a zero trust network access gateway) for an enterprise network, the network appliance configured in a cluster of nodes each similarly configured to support network functions; a data store storing an update to network configuration settings for the cluster; a threat management facility configured to provide a user interface for receiving an update request from a network administrator to perform the update to the cluster of nodes, the threat management facility further configured to respond to the update request by automatically and sequentially updating network configuration settings for each node in the cluster by selecting one of the nodes for an update; isolating the node from the cluster while continuing to operate the cluster with the remaining plurality of nodes; updating the network configuration settings with an update for the node; testing a connectivity of the node with the update; and returning the node to the cluster with the update if the connectivity passes one or more tests; and an update agent executing on each node in the cluster, the update agent responsive to the threat management facility to update the network settings according to the update.

Figure 18:
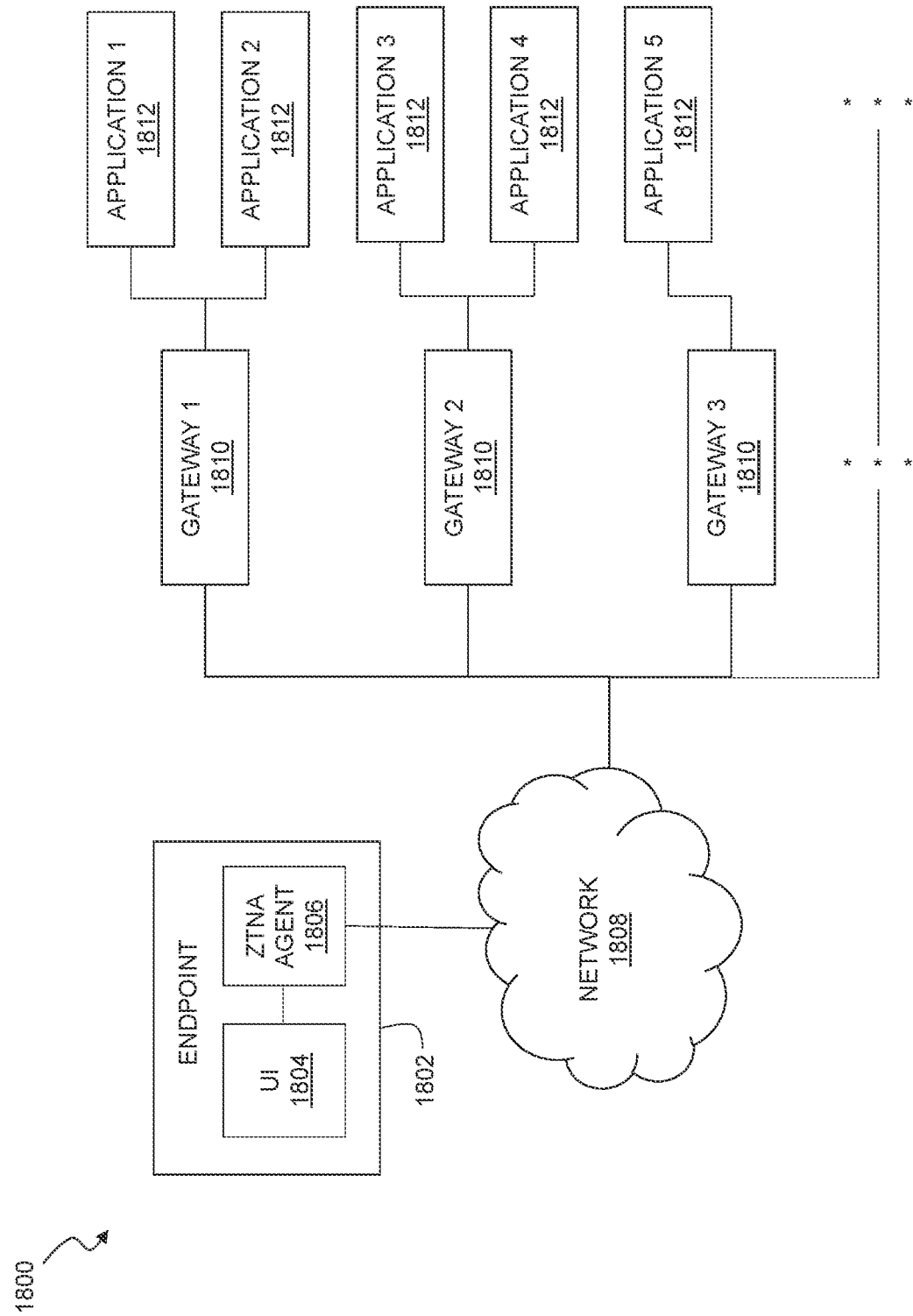
FIG. 18 shows an endpoint coupled to multiple application gateways.

FIG. 18 shows an endpoint coupled to multiple application gateways. The system 1800 may, for example, be any of the Zero Trust Network Access (ZTNA) architectures described herein, except where specifically noted otherwise. In the system 1800, a ZTNA gateway may provide user access to specific applications on an application-by-application and user-by-user basis, rather than providing general access to an enterprise network. To do so, a gateway such as a ZTNA application gateway is hosted in the network and collocated with a number of ZTNA resources such as end user applications managed by the gateway. If different applications are in different geographical locations, then a different gateway would be hosted in each location to manage any collocated applications. This is also generally true of cloud resources managed by third parties such as Amazon's AWS, Microsoft's Azure, Google's GCP, and other cloud providers. These deployments can significantly improve network security because users only receive access to specific applications for which they are authenticated. However, if the user needs to connect to applications that are hosted in different geolocations or hosted by different provides, then, in some aspects, they must manage multiple authentications and communication channels.

To address these challenges, a ZTNA agent may be deployed on an endpoint that can identifying and manage connections to multiple application gateways. When the user selects an application for local use, the agent can identify the corresponding gateway to connect to from configuration data stored by the agent, such as a mapping of the application name to an application Fully Qualified Domain Name (FQDN-a complete domain name for a specific computer or host on the internet, typically including a hostname and a domain name) and/or the gateway FQDN. The agent can then establish an encrypted tunnel to send/receive data to/from the application. If a tunnel is already established to the gateway, then the data stream for that application can be multiplexed with the data streams of other applications being accessed through that gateway. This technique facilitates optimization of the number of network connections and/or bandwidth utilization in a multi-resource context.

Furthermore, security for endpoints using such a local ZTNA agent can be centrally managed, e.g., by a cloud-based threat management facility coupled in a communicating relationship with the endpoint and the various application gateways.

In general, the endpoint 1802 may be any of the endpoints or other compute instances described herein. The endpoint 1802 may include a user interface 1804 through which a user may interact with various applications locally on the endpoint 1802. The endpoint 1802 may also include a ZTNA agent 1806 for accessing remotely hosted ZTNA applications through a network 1808 such as any of the data networks described herein. While the network 1808 may or may not be secure, end to end communications between the ZTNA agent 1806 and applications 1812 may be secured, e.g., using a secure tunnel and a secure websocket client.

In one aspect, the ZTNA agent 1806 may advantageously use a heartbeat relationship with a threat management facility to assist in forming a secure connection with one of the gateways 1810. For example, the endpoint 1802 may include an endpoint heartbeat module executing within a local security agent or the like on the endpoint 1802 that is used to maintain a secure heartbeat relationship with the threat management facility. The web socket client of the ZTNA agent 1806 may include a certification manager or the like that interacts with the endpoint heartbeat module to obtain certificates for the endpoint 1802 and one of the gateways 1810 that are collectively required during a WSS handshake to form a secure WebSocket connection over encrypted TLS. Where the threat management facility is a certificate authority, this can advantageously provide a pre-existing trust relationship for forming secure connections.

The system 1800 may also include a number of gateways 1810 such as ZTNA application gateways coupled to the network 1808. The gateways 1810 may be distributed at any number of geographic and/or network locations, and each gateway 1810 may support any number of applications 1812 that are locally deployed or managed at corresponding locations.

Figure 19:
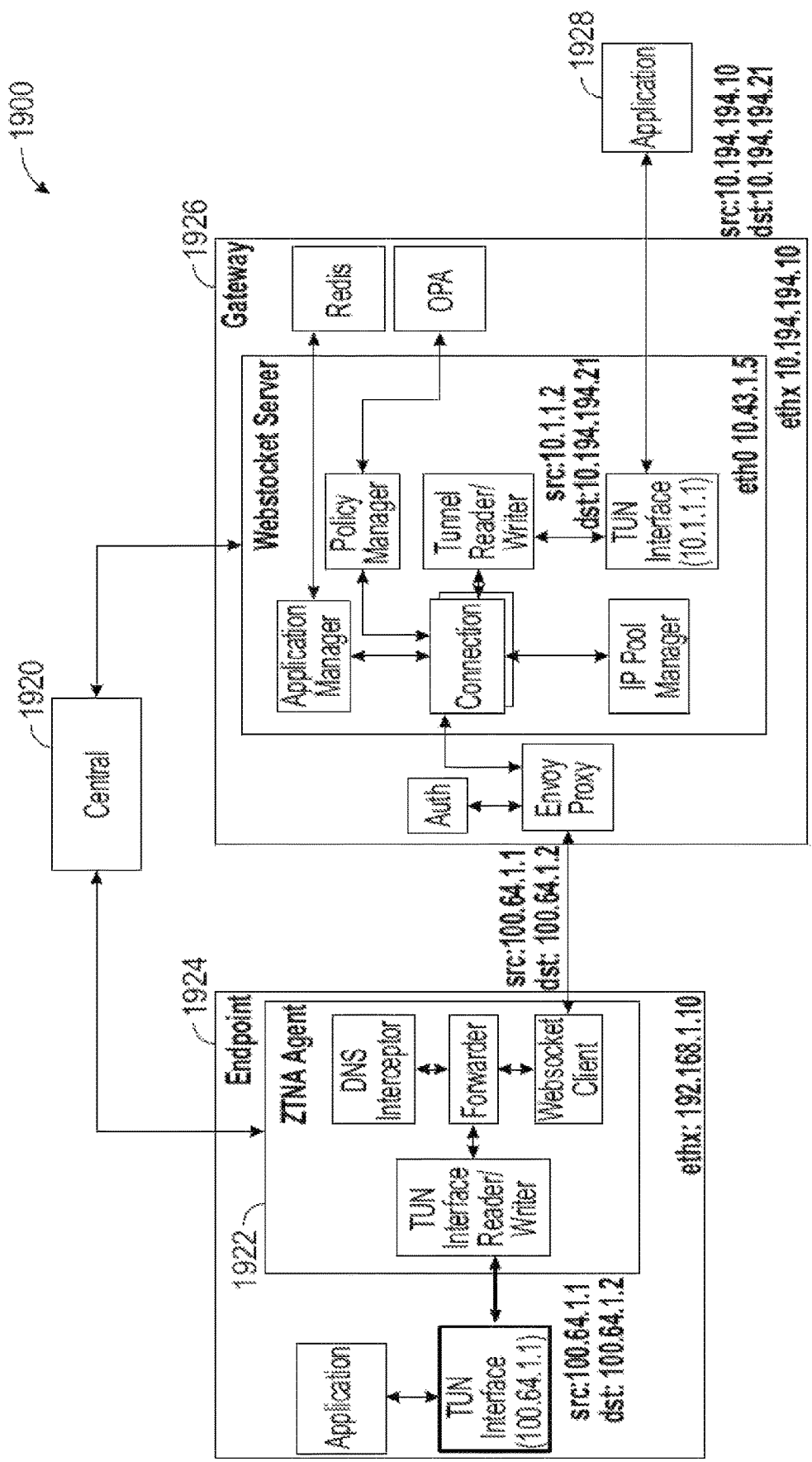
FIG. 19 shows a threat management facility for a ZTNA system.

FIG. 19 shows a threat management facility for a ZTNA system. In general, the system 1900 may be any of the systems described above with reference to FIG. 18. The system 1900 may also include a central management facility 1920, such as any of the threat management facilities described herein for managing security policies for an enterprise or the like. In order to manage security policies for ZTNA applications, the central management facility 1920 may, on one hand, be coupled in a communicating relationship with the ZTNA agent 1922 executing on the endpoint 1924. The central management facility 1920 may also be coupled in a communicating relationship with a ZTNA gateway 1926 that hosts an application 1928 used by the endpoint 1924.

In general, the ZTNA agent 1922 may tunnel traffic, e.g., by tunneling IP packets over a WebSocket connection, from the application 1928. The application 1928 may be a thick application that does not use web-based protocols like HTTPS. The agent 1922 may capture corresponding application traffic by spoofing the DNS response to the original application request, and providing an IP address that the agent 1922 can use to handle application traffic. This may be done, for example, by setting a TUN interface at the endpoint 1924 and configuring it with an IP address from a CGNAT subnet, along with a default route that directs all traffic for the subnet to the TUN interface. This way traffic from a ZTNA application is directed to the TUN interface and the ZTNA agent 1922 can read these IP packets from the TUN interface and forward them to the ZTNA gateway 1926 over the WebSocket connection.

At the ZTNA gateway 1926, a WebSocket server may read the IP packets from the ZTNA agent 1922 and identify a hosted ZTNA application corresponding to the destination address. Once the WebSocket server learns the IP address of the internal application, the WebSocket server can modify the source and destination IP addresses of the packets and write to the WebSocket server's own TUN interface. This TUN interface is configured with a 10.1.x.x subnet, and is also configured to forward all the traffic with a source IP address in that subnet. Thus, each agent connection can be assigned one source IP address, and all of the packets that are coming from the ZTNA agent's WebSocket connection will be rewritten with the same source IP address (and forwarded to the same TUN interface). The WebSocket server may also configure iptables rules such that network address translation by the WebSocket server connects return traffic from a ZTNA application to the appropriate ZTNA agent (after rewriting source and destination IPs appropriately).

Also, in general, the ZTNA gateway 1926 may authenticate both the user and endpoint device. The user may be authenticated, e.g., using any suitable identity provider or the like. The device may authenticate using a certificate or the like received from a central threat management facility or other certificate authority. The ZTNA gateway 1926 may also advantageously apply security polices for an enterprise to packets from a ZTNA agent to a ZTNA application, and may conditionally permit or deny traffic based on such security policies.

According to the foregoing, there is disclosed herein a system including an endpoint, a ZTNA gateway, a ZTNA application, and a threat management facility. The endpoint may include a local application with a first tunnel interface locally coupled to a ZTNA agent executing on the endpoint, and the ZTNA agent may include a websocket client or other interface for securely coupling to a remote resource through a data network. The ZTNA gateway may be coupled to the ZTNA agent of the endpoint through a websocket server executing on the ZTNA gateway, where the ZTNA gateway is configured to authenticate the endpoint for access to applications managed by an enterprise (e.g., by the threat management facility). The ZTNA application may be coupled to the websocket server of the ZTNA gateway through a second tunnel interface, thereby forming a secure connection between the local application on the endpoint and the ZTNA application hosted through the ZTNA gateway. The threat management facility may be coupled in a communicating relationship to the ZTNA agent and the ZTNA gateway, and the threat management facility may be configured to manage a security policy for use of the ZTNA application by users associated with the enterprise.

As noted above, the ZTNA agent 1922 may more specifically be configured to form multiple connections with multiple ZTNA gateways, and to multiplex communications with applications hosted by these gateway in order to support seamless and transparent use of geographically distributed and remotely hosted applications.

In one aspect, the ZTNA agent 1922 may be deployed as a plugin in an existing software component of the endpoint 1924 such as a local security agent. ZTNA functionality can be enabled and controlled in the threat management facility for all endpoints of an enterprise. Once it is enabled, the threat management facility may push configuration information about ZTNA gateways and the applications that are deployed in each gateway, e.g., by communicating this with other endpoint policies from the threat management facility. The ZTNA agent 1922 may set up a TUN interface and configure an IP address for use of ZTNA applications, e.g., using large-scale network address translation (also referred to as carrier-grad network address translation or CGNAT) to avoid conflicts with internal networks. The ZTNA agent 1922 may also set up a route such that all the traffic to the CGNAT IP address space goes through the TUN interface. This may be initialized when the ZTNA agent 1922 is booted, so that when a user accesses a configured application, the DNS request goes to a DNS interceptor that is running in the ZTNA agent 1922 and the DNS interceptor responds with one of the CGNAT IP addresses from the configured CGNAT subnet of the TUN interface. Any resulting application traffic from the endpoint 1924 will then be forwarded to the ZTNA application gateway over a WebSocket connection. To establish the WebSocket connection, the ZTNA agent 1922 can be authenticated with the gateway, e.g., using an embedded browser. The communications for this authentication may be secured using mutual transport layer security (TLS) or any other suitably secure communication protocol.

The WebSocket server executing on the ZTNA gateway 1926 may be responsible for tunnelling IP packets that are received from the ZTNA agent 1922 over the websocket connection (and addressed to an application hosted by the gateway 1926). The WebSocket server may run, e.g., as a container in Kubernetes or the like. The WebSocket server may then set up a TUN interface and configure the IP table rules such that it forwards traffic from the ZTNA agent 1922 to an appropriate hosted application. When forwarding the traffic, the WebSocket server may use source NAT, such that internal application see that the traffic is coming from the gateway 1926. The WebSocket server may drop incoming traffic when the websocket connection is slow. In some embodiments, the websocket server may automatically recover dropped traffic with a TCP connection.

In general, the Application Manager of the WebSocket server may be responsible for reading applications from a configuration store ("Redis" in FIG. 19) when the WebSocket server is booted. The Application Manager may also subscribe to changes from Redis, so that whenever the application is changed by an administrator at the threat management facility, those new details are propagated to the Application Manager. The Application manager may also handle Domain Name Server (DNS) resolution if the application is configured with a Fully Qualified Domain Name (FQDN). When other modules request the application from the Application Manager, the Application Manager performs a DNS resolution and returns the appropriate application information. For example, the returned application structure can have multiple internal IP addresses, which may be sorted, and the connection may use the first IP address from the resolved data.

The IP Pool Manager may maintain a pool of IP addresses within a given subnet. If there are multiple websocket server instances running, each one should have a separate subnet. The WebSocket server assigns an IP address from the pool for each websocket connection, and when a connection is closed the IP address is released back to the pool for use in other connections.

The Policy Manager may be responsible for checking policy status with a policy agent. The Policy Manager may, for example, communicate with the policy agent using REST APIs. Whenever the Policy Manager receives a policy evaluation request for a WebSocket connection, the Policy Manager may send a corresponding REST API request to the policy agent with connection cookie, anti-virus status, syncsec_status (synchronized security heartbeat status), and application identifier (such as a 128-bit universally unique identifier) for which the policy evaluation request is done. The websocket connection may perform policy evaluation requests for incoming packets under certain conditions, such as when the last policy evaluated time is more than 5 mins or any other suitable timeframe.

The Tunnel Reader/Writer may be responsible for setting up a TUN interface inside the WebSocket container and may assign a first available IP address from a given subnet (IP pool subnet) to the interface. The Tunnel Reader/Writer may also set up an IP table rule such that all the packets that are written to this interface are forwarded correctly, and may also configure the iptables rules to do SNAT or the like on traffic that is coming from the TUN interface. This happens when the WebSocket Server is initialized. The Tunnel Reader/Writer may also provide APIs for a websocket connection to write IP packets to the TUN interface and also read packets from the TUN interface. The WebSocket Server may be responsible for reading from the TUN interface and handover the packet to a corresponding websocket connection.

Figure 20:
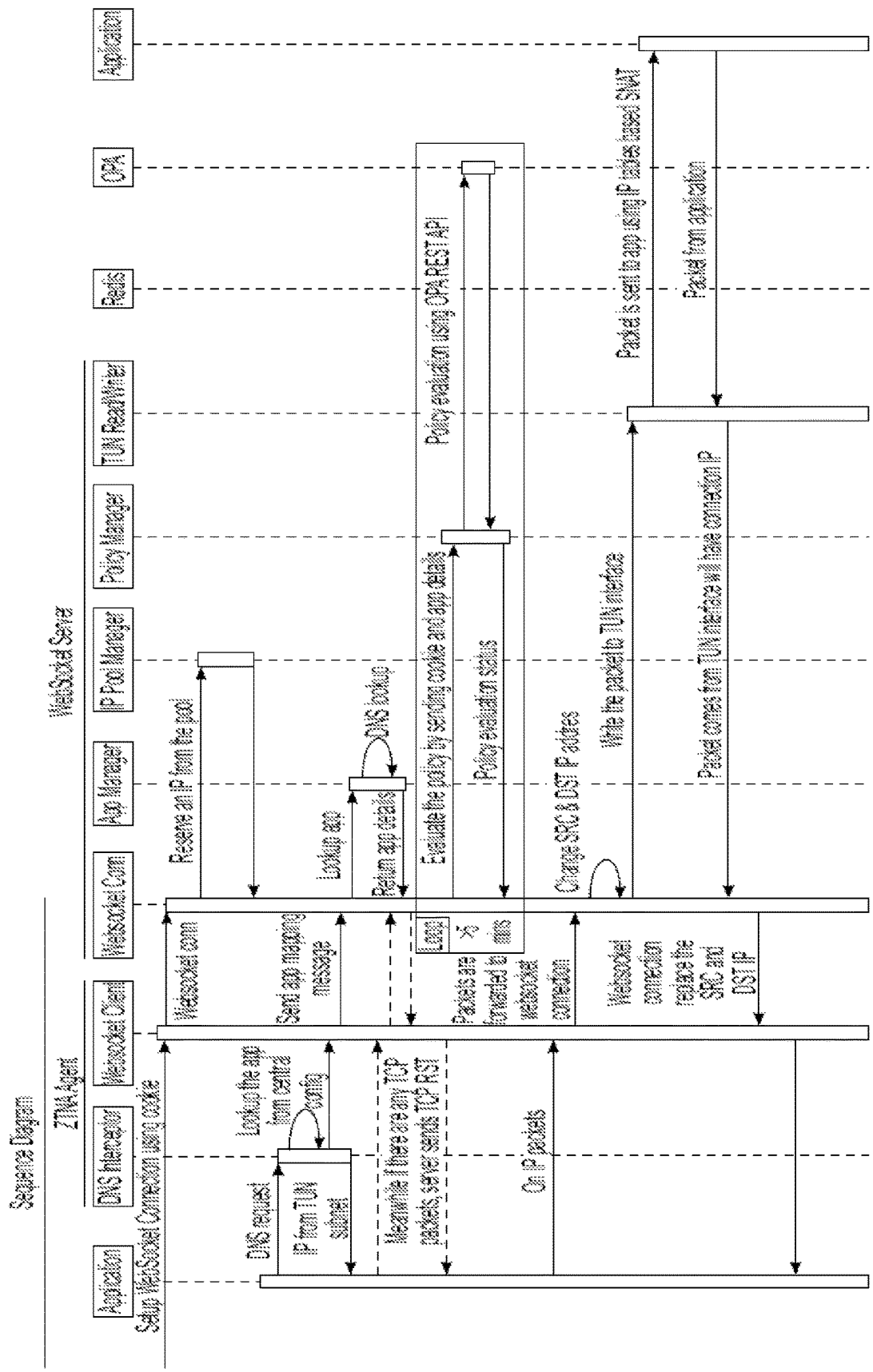
FIG. 20 illustrates a sequence diagram for access and use of remotely hosted applications.

FIG. 20 illustrates a sequence diagram for access and use of remotely hosted applications as described herein. In general, when an application is launched on an endpoint, the ZTNA agent may setup a websocket connection and the websocket server may reserve an IP address for the connection for an IP Pool manager. When the application on the endpoint forwards a DNS request, the ZTNA agent may look up the application from the threat management facility (or other central resource), and send an application mapping message to the websocket server (on the gateway) along with an IP address assigned to the websocket connection. On the other hand, the WebSocket server may lookup the application, including a DNS lookup, and return application details for use by the ZTNA agent on the endpoint. With the appropriate address information in place and the websocket connection created, packets containing application traffic may be communicated through the websocket connection between the ZTNA agent and the application gateway, with source and destination addresses changed as packets pass through the websocket interface.

In general, an enterprise security policy for the connection may be managed (in the application layer) using a policy manager executing on the application gateway and coupled in a communicating relationship with the threat management facility. At the same time, communications between the ZTNA application gateway and the ZTNA application can be secured through a TUN network interface or other virtual point-to-point network tunnel or virtual private network interface or the like, and addressed using a secure network address translation or the like.

Figure 21:
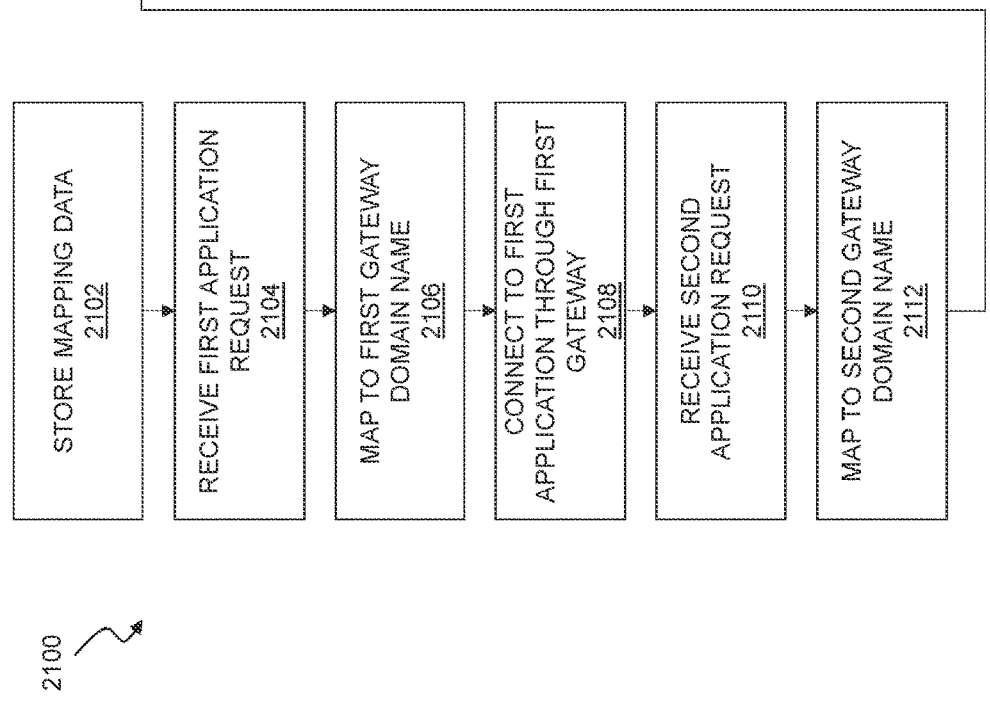
FIG. 21 shows a method for using distributed ZTNA resources.

FIG. 21 shows a method for using distributed ZTNA resources. In general, using the following method 2100, an endpoint may seamlessly and concurrently use a number of different ZTNA applications hosted at different ZTNA gateways in different geographic or network locations. As a significant advantage, an administrative policy for an enterprise that provides such applications may be centrally managed at a threat management facility or the like, and deployed to each ZTNA gateway for local use at the application layer to provide administrative or policy-based control of application usage for authorized users of the enterprise network. At the same time, an end user can enjoy seamless use of multiple ZTNA applications or the like at a single endpoint without regard to physical or logical location on a network.

As shown in step 2102, the method 2100 may include maintaining a data store of hosted applications. For example, this may include storing a mapping of a plurality of applications to a plurality of fully qualified domain names for zero trust network access gateways. Where applications are themselves identified by fully qualified domain names, the mapping may also or instead map the fully qualified domain name for each application to the fully qualified domain name for a corresponding one of the gateways. This mapping may be stored, e.g., on an endpoint for use by the agent. This permits the ZTNA agent on the endpoint to locate a suitable ZTNA application gateway for a number of different applications that are managed, e.g., by a threat management facility or other enterprise resource. Maintaining the data store may also include periodically updating the mapping, e.g., by updating the mapping remotely from a threat management facility for an enterprise network associated with the endpoint, or using some other central management resource or data store.

As shown in step 2104, the method 2100 may include receiving a request at an endpoint for access to a first application remotely hosted on a network. This may occur, e.g., in response to a user locally selecting and launching the application within a user interface of the endpoint, or otherwise receiving a request for the application by a user or process on the endpoint. In general, the endpoint may be any of the endpoints described herein, and the first application may be a ZTNA application or other application hosted through a ZTNA gateway.

In general, the first time a user accesses a protected resource such as one of the ZTNA applications, the user will be required to authenticate to the configured identify provider with the user's credentials. This may be a third party identity provider, of which several commercial alternatives are available, or a proprietary identity provider management by an enterprise associated with the endpoint (or a user of the endpoint). The user authentication may subsequently be checked by searching for a corresponding cookie or other token in a secure store on the endpoint. If this cookie (or other token) is not available from the endpoint, then the ZTNA agent may write a sign-in URL to the registry key which will be watched by the endpoint user interface. The change in the value may invoke an Embedded browser (Endpoint UI) and cause a GET request to the sign-in URL, which the gateway can then redirect to the identity provider. The user may then manually provide credentials to the identity provider, and the gateway can handle a token request from the identity provider and a response to the endpoint with the corresponding cookie (or other token). For example, a response from the gateway may include a cookie based on the interaction with the identity provider, and the Endpoint UI (Embedded Browser) may transfer the cookie to the ZTNA Agent. On receiving the cookie from the embedded browser, a User Auth Agent may inform a ZTNA Component Manager to use this cookie in order to make a WebSocket Tunnel. The cookie may be stored in any suitable local, secure data store such as a tamper protected store, encrypted store, or the like.

As shown in step 2106, the method 2100 may include, with an agent executing on the endpoint, mapping the first application to a fully qualified domain name for a first zero trust network access gateway for the first application. The agent may, for example, include a ZTNA agent, a local security agent, or any other agent or combination of software agents executing on the endpoint for browser-based access or other access to a ZTNA application remotely hosted through a ZTNA gateway or the like.

As shown in step 2108, the method 2100 may include connecting to the first application through the first ZTNA gateway using an encrypted or otherwise secure communication channel, such as the WebSocket Tunnel described above. The application may then be rendered in a user interface of the endpoint and/or used by the endpoint as appropriate, with data, commands, and aspects of the user interface communicated as needed through the secure communication channel.

As shown in step 2110, the method 2100 may include receiving a second request at the endpoint for access to a second application remotely hosted on the network. This may, for example, be a separate ZTNA application, provided through a ZTNA gateway, that a user wishes to use concurrently with the first application, either in cooperation with the first application, or independently from the first application. This may also, for example, include an application that provides data or processing resources useful for the first application, or useful for another application or process executing on the endpoint.

As shown in step 2112, the method 2100 may include mapping the application to a second gateway domain name, e.g., using any of the techniques described herein.

As shown in step 2114, the method 2100 may include determining if the second gateway, as specified by the second gateway domain name, is the same as the first gateway. If the second gateway is different than the first gateway, then the method 2100 may proceed to step 2116 where a new secure channel such as an encrypted tunnel is created for the second gateway to communicate with the endpoint. If the second gateway is the same as the first gateway, then the method 2100 may proceed to step 2120 where the first and second applications are multiplexed through a single secure channel to the endpoint using the existing secure tunnel (or other secure, encrypted channel or the like).

As shown in step 2116, the method 2100 may include connecting to the second application through the second gateway. This may, for example, include connecting to a ZTNA application through a ZTNA gateway using a secure tunnel or other encrypted channel or the like. The second gateway may, for example, be logically or physically remote from the first gateway such that the first gateway cannot support access to associated ZTNA applications. In this case, an additional secure channel must be created to this separate resource, e.g., by creating a secure tunnel as described above.

As shown in step 2118, the method 2100 may include multiplexing one or more additional application sessions for one or more additional applications requested by the endpoint, e.g., in cases where one or more of these additional applications are hosted on ZTNA gateways that already have a secure tunnel established with the local security agent or other agent executing on the endpoint.

As shown in step 2120, the method 2100 may include multiplexing the application session. For example, if the endpoint has an encrypted tunnel (e.g., through the TUN interface and secure websocket connection as described herein) to the first zero trust network access gateway for a second application, this may include, with the agent executing on the endpoint, multiplexing communications with the first application and the second application through the existing encrypted tunnel.

As shown in step 2122, the method 2100 may include multiplexing one or more additional application sessions. For example, in one aspect, the method 2100 may include, with the agent executing on the endpoint, performing the steps of: receiving a request at the endpoint for access to a third application remotely hosted through a second zero trust network access gateway geographically remote from the first zero trust network access gateway; mapping a third fully qualified domain name for the third application to the second zero trust network access gateway; and creating a second encrypted tunnel for communications with the third application. In another aspect, the method 2100 may include, with the agent executing on the endpoint, performing the steps of: receiving a request at the endpoint for access to a third application remotely hosted through a second zero trust network access gateway geographically remote from the first zero trust network access gateway; mapping a third fully qualified domain name for the third application to the second zero trust network access gateway; and multiplexing communications with the first application and the third application through the agent.

Figure 22:
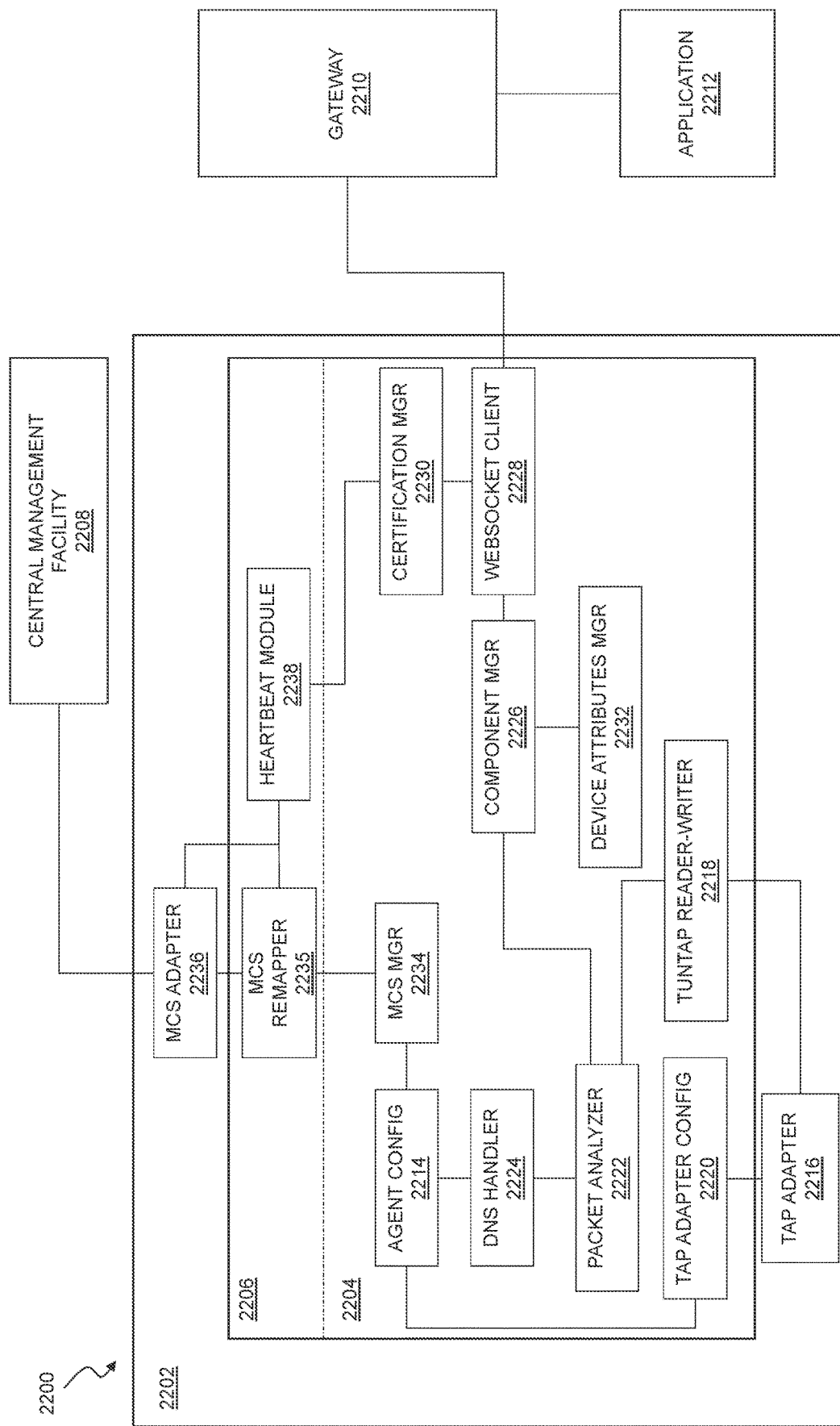
FIG. 22 illustrates an endpoint in a ZTNA system.

FIG. 22 illustrates an endpoint in a ZTNA system. The system 2200 may be, for example, the ZTNA system illustrated in FIG. 18 or 19, or more generally, any of the ZTNA systems described above, except where specifically stated otherwise. In general, ZTNA applications may be accessed from an endpoint 2202 on an enterprise network, such as any of the endpoints described herein. The endpoint 2202 may include a ZTNA agent 2204 and an NTP service 2206. The endpoint 2202 may be coupled in a communicating relationship with a central management facility 2208, such as any of the threat management facilities described herein for managing security policies for an enterprise or the like. The endpoint 2202 may also be coupled in a communicating relationship with a ZTNA gateway 2210 that hosts a ZTNA application 2212 used by the endpoint 2202.

The ZTNA agent 2204 may create and manage connections to remote applications such as the application 2212. This may include one or more components for processing data, such as an agent configurator 2214, a tap adapter 2216, a TunTap reader-writer component 2218, a tap adapter configurator 2220, a packet analyzer 2222, a DNS handler 2224, a component manager 2226, a web socket client 2228, a certification manager 2230, and a device attributes manager 2232. In general, the ZTNA agent 2204 may establish a secure connection with the ZTNA gateway 2210 and access the ZTNA application 2212 based on a ZTNA policy.

The agent configurator 2214 may be responsible for setting a configuration of the agent 2204 according to a ZTNA policy, which may be stored locally or received form the central management facility 2208, e.g., in XML format or using any other suitable syntax or structure. A thread on the endpoint may monitor for policy changes so that a local policy cache can remain current with updates from the central management facility 2208. The ZTNA policy may, for example, include a list of gateways and applications available to enterprise endpoints, which may be converted to an in-memory map and sent to the DNS handler 2224 for use in creating connections when an application is locally requested on the endpoint 2202. The agent configurator 2214 may also manage IP ranges for application FQDNs obtained from the central management facility 2208. After receiving an application list, the agent configurator 2214 may provide a count of configured applications (received from the central management facility 2208) to the tap adapter configurator 2220. After this notification, the agent configurator 2214 may get the start and end addresses of the IP range that it can use, and then manage an IP to host mapping. These results are provided to the DNS handler 2224 and TAP adapter configurator 2220 for use in setting up connections with remote ZTNA applications.

The tap adapter 2216 may be an open-source component configured to intercept and process IP packets received at the ZTNA agent 2204, or more generally, any network driver or the like used by virtual private network services or other similarly secure connection services to connect to servers. For example, the tap adapter 2216 may include an openvpn tap adapter configured in Tun mode to intercept IP packets, or a TAP-Windows Adapter or any other suitable network driver or the like. The tap adapter 2216 may send the intercepted IP packets to the TunTap reader-writer component 2218, which may then forward the packets to the packet analyzer 2222. More generally, the TunTap reader-writer component 2218 may read IP packets from the tun interface, forward packets to the packet analyzer 2222, and write brackets back to the virtual interface for the secure connection.

The tap adapter configurator 2220 may configure the tap adapter 2216 as appropriate. For example, the tap adapter configurator 2220 may configure the TunTap adapter 2216 in Tun Mode to permit reading and writing of IP packets. More generally, the tap adapter configurator 2220 may assign a virtual IP address, DHCP, and subnet mask settings for the tap adapter 2216. In one aspect, the configuration of the tap adapter 2216 may depend on the count of configured applications from the central management facility 2208, e.g., by providing a sufficient IP address range in the subnet for the entire application list.

The packet analyzer 2222 may interpret IP packets according to a selected protocol such as DNS, TCP, UDP, or ICMP. For DNS packets, the packet analyzer 2222 may ignore the packets or send the packets back to the reader-writer component 2218 based on a response from the DNS handler 2224. For TCP, UDP, and ICMP packets, the packet analyzer 2222 may route the packets to the component manager 2226.

The DNS handler 2224 may receive filtered packets from the packet analyzer 2222. The DNS handler 2224 may check to see if the FQDN listed in the map constructed by the agent configurator 2214 can be found. If the FQDN is not found, then the request from the ZTNA application 2212 is ignored. If the FQDN is found, the DNS handler 2224 may process the packets to form a DNS answer and send the DNS answer to the packet analyzer 2222.

The ZTNA component manager 2226 may generally manage secure connections to remote ZTNA applications, e.g., through the integration of ZTNA components into the NTP service for the ZTNA agent 2204. This may include handling packets from the packet analyzer 2222 and forwarding the packets to the web socket client 2228, handling responses from the web socket client 2228, managing a device attributes monitor thread, integrating components of the ZTNA agent 2204 into the NTP service, and managing a browser instance at a user interface to allow a user to enter their credentials for accessing ZTNA applications. The component manager 2226 may also manage a message queue to handle a multitude of requests coming from one or more applications on the enterprise network.

The web socket client 2228 may use secure web sockets to set up a WSS communication channel with the ZTNA gateway 2210. The web socket client 2228 may use an SSL or TLS handshake to establish the communication channel. The web socket client 2228 may communicate with the certification manager 2230, which may obtain certificates for the endpoint 2202 and the gateway 2210 that are collectively required during the handshake. In one aspect, this may include obtaining a cookie during user authentication for a new web socket tunnel, and providing the cookie in a WSS connection header when communicating with the web socket server of a ZTNA gateway.

The device attributes manager 2232 may fetch a static list of device attributes to send to the gateway 2210. The device attributes may include one or more of an anti-virus status and an endpoint SynSec status.

The MCS manager 2234 may be a multicast service manager or other suitable network services component for managing the interaction of the ZTNA agent 2204 with the NTP service 2206. The MCS manager 2234 may receive ZTNA policies from the NTP service 2206 and send them to the agent configurator 2214.

The NTP service 2206 may be in a communicating relationship with the ZTNA agent 2204 at the endpoint 2202. The NTP service 2206 may include one or more components, such as an MCS remapper 2235 and a heartbeat module 2238. An MCS adapter 2236 may also or instead be included on the endpoint 2202. One or more of the MCS remapper 2235 and the MCS adapter 2236 may receive ZTNA policies downloaded from the central management facility 2208. The ZTNA policy may be received in XML format and then subsequently pushed to the MCS manager 2234. The certification manager 2230 may interact with the heartbeat module 2238 to obtain certificates for the certification manager 2230, such as an endpoint certificate and a gateway certificate, that are required during a WSS handshake to form a secure WebSocket connection.

Using the components of a ZTNA agent 2204 and NTP service 2206 as described above, a user may authenticate and create a secure connection for ZTNA access to a ZTNA application through a ZTNA gateway as described herein. The first time a user requests access to a protected resource such as the application 2212, the user may be required to authenticate to the configured Identity Provider (IDP) with credentials. In general, an IDP is a service that creates, maintains, and manages identity information for users, and provides authentication services to other applications within a distributed network. A variety of open and proprietary IDP standards and services are available, including third party IDP services that are commercially available, as well as IDP services that can be deployed and managed by an administrator of an enterprise network. In the current context, the IDP may be any identity provider providing suitable security and reliability for use in a ZTNA platform as contemplated herein.

When a user requests access to an application at the gateway 2210, the ZTNA agent may check for an available cookie in the store. If no cookie is available then the ZTNA agent 2204 may write a sign-in url to a registry key that can be watched by the endpoint. A change in the value may invoke an Embedded browser (Endpoint UI) and make a GET request to the sign-in url, which the gateway can redirect to the IDP. The user can then manually provide credentials in the user interface, and when these credentials are posted to the IDP, the gateway can manage a token request with the IDP and respond to the client with a cookie. A response from the gateway to the endpoint will include the cookie for use in creating a secure connection and accessing the application(s) 2212 requested by the endpoint. For example, the endpoint UI (Embedded Browser) may transfer the cookie to the ZTNA agent 2204, where the ZTNA component manager 2226 may use this cookie when creating a Web Socket Tunnel for communication with the gateway 2210. The cookie may be stored in a tamper protected store or other secure cache or the like to prevent malicious interception and use.

According to the foregoing, there is more generally described herein a zero trust network access (ZTNA) system comprising: an endpoint, the endpoint including a local application with a first tunnel interface locally coupled to a ZTNA agent executing on the endpoint, the ZTNA agent further including a WebSocket client; a ZTNA gateway coupled to the ZTNA agent of the endpoint through a websocket server executing on the ZTNA gateway, the ZTNA gateway configured to authenticate the endpoint for access to applications managed by an enterprise; a ZTNA application coupled to the websocket server of the ZTNA gateway through a second tunnel interface, thereby forming a secure connection between the local application on the endpoint and the ZTNA application hosted through the ZTNA gateway; and a threat management facility coupled in a communicating relationship to the ZTNA agent and the ZTNA gateway, the threat management facility configured to manage a security policy for use of the ZTNA application by users associated with the enterprise.

The ZTNA agent may be configured to couple through a data network to two or more ZTNA applications hosted by two or more ZTNA gateways deployed at separate network locations, for which separate secure encrypted channels may be created. The ZTNA agent may also or instead couple to two or more ZTNA applications hosted by a single ZTNA gateway, in which case communications for the two or more ZTNA applications may be multiplexed on a single, secure encrypted communication channel. In one aspect, the ZTNA gateway may be a virtual appliance executing on a cloud computing platform. The endpoint may also or instead be a virtual compute instance executing on a cloud computing platform.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
receiving a request to update network configuration settings for a plurality of nodes in a cluster, wherein the cluster operates as a zero trust network access gateway;
selecting a node from the plurality of nodes;
isolating the node by preventing the node from participating in the cluster, thereby providing an isolated node, while continuing to operate the cluster with a remaining plurality of nodes other than the isolated node;
updating the network configuration settings with an update for the isolated node;
providing one or more network resources for connectivity testing;
testing a connectivity of the isolated node that has updated network configuration settings by using a connectivity check by the isolated node to the one or more network resources, the connectivity check performed autonomously by the isolated node after the update to the isolated node, wherein the isolated node is configured to conditionally accept the update based on a result of the connectivity check by the isolated node;

passing the connectivity check with the isolated node; and
in response to passing the connectivity check, returning the isolated node that has the updated network configuration settings to the cluster.

2. The method of claim 1, wherein testing the connectivity of the isolated node with the update includes testing a connection to one or more resources configured locally on a gateway.

3. The method of claim 1, wherein testing the connectivity of the isolated node with the update includes testing a connection to a resource administratively configured for testing connections of nodes.

4. The method of claim 1, further comprising returning a failed changelog to an administrator if the connectivity does not pass the connectivity check.

5. The method of claim 1, further comprising sequentially updating the network configuration settings for each of the plurality of nodes in the cluster.

6. The method of claim 1, wherein the cluster of nodes operates as a network appliance.

7. The method of claim 1, wherein the one or more network resources for testing the connectivity of the isolated node includes at least one predetermined resource endpoint identified by an administrator for connection testing.

8. The method of claim 1, wherein in each node in the plurality of nodes in the cluster is updated sequentially.

9. The method of claim 1, selecting the node from the plurality of nodes includes selecting the node based on one or more of a cluster load, a fault tolerance, a resource utilization, a number of services hosted on a particular node, and a number of requests to and from the zero trust network access gateway.

10. A non-transitory computer-readable medium embodying computer executable code that, when executing on one or more computing devices forming a computing cluster for a network appliance, perform the steps of:
receiving a request to update network configuration settings for a plurality of nodes in a cluster, wherein the cluster operates as a zero trust network access gateway;
selecting a node from the plurality of nodes;
isolating the node by preventing the node from participating in the cluster, thereby providing an isolated node, while continuing to operate the cluster with a remaining plurality of nodes other than the isolated node;
updating the network configuration settings with an update for the isolated node;
providing one or more network resources for connectivity testing;
testing a connectivity of the isolated node that has the updated network configuration settings by using a connectivity check by the isolated node to the one or more network resources, the connectivity check performed autonomously by the isolated node after the update to the isolated node, wherein the isolated node is configured to conditionally accept the update based on a result of the connectivity check by the isolated node; and
returning the isolated node to the cluster when the isolated node that has the updated network configuration settings passes the connectivity check to the one or more network resources.

11. The computer readable medium of claim 10, further comprising code that performs the step of rolling back the update and returning the isolated node to the cluster without the update if the connectivity does not pass the connectivity check.

12. The computer readable medium of claim 10, wherein testing the connectivity of the isolated node with the update includes testing a connection to one or more resources configured locally on a gateway.

13. The computer readable medium of claim 10, wherein testing the connectivity of the isolated node with the update includes testing a connection to a resource administratively configured for testing connections of nodes.

14. The computer readable medium of claim 10, further comprising code that performs the step of sequentially updating the network configuration settings for each of the plurality of nodes in the cluster.

15. The computer readable medium of claim 10, selecting the node from the plurality of nodes includes selecting the node based on one or more of a cluster load, a fault tolerance, a resource utilization, a number of services hosted on a particular node, and a number of requests to and from the zero trust network access gateway.

16. A system comprising:
a network appliance for an enterprise network, the network appliance configured in a cluster of nodes each similarly configured to support network functions;
a data store storing an update to network configuration settings for the cluster;
a threat management facility configured to provide a user interface for receiving an update request from a network administrator to perform the update to the cluster of nodes, the threat management facility further configured to respond to the update request by automatically and sequentially updating the network configuration settings for each node in the cluster by selecting a node from the cluster, wherein the threat management facility is a cloud-based threat management facility coupled in a communicating relationship with the network appliance and one or more zero trust network access application gateways; isolating the node by preventing the node from participating in the cluster, thereby providing an isolated node, while continuing to operate the cluster with a remaining plurality of nodes other than the isolated node; updating the network configuration settings with the update for the isolated node; providing one or more network resources for connectivity testing; testing a connectivity of the isolated node that has updated network configuration settings by using a connectivity check by the isolated node to the one or more network resources, the connectivity check performed autonomously by the isolated node after the update to the isolated node, wherein the isolated node is configured to conditionally accept the update based on a result of the connectivity check by the isolated node; and returning the isolated node to the cluster when the isolated node that has the updated network configuration settings passes the connectivity check to the one or more network resources; and
an update agent executing on each node in the cluster, the update agent responsive to the threat management facility to update the network configuration settings according to the update.

17. The system of claim 16, wherein the network appliance is a zero trust network access gateway.

18. The system of claim 16, wherein testing the connectivity of the isolated node with the update includes testing a connection to one or more resources configured locally on a gateway.

19. The system of claim 16, selecting the node from cluster includes selecting the node from the cluster based on one or more of a cluster load, a fault tolerance, a resource utilization, a number of services hosted on a particular node, and a number of requests to and from the one or more zero trust network access application gateways.

20. The system of claim 16, wherein testing the connectivity of the isolated node with the update includes testing a connection to a resource administratively configured for testing connections of nodes.

* * * * *